(12) United States Patent
Fiolka et al.

(10) Patent No.: US 10,989,661 B2
(45) Date of Patent: Apr. 27, 2021

(54) UNIFORM AND SCALABLE LIGHT-SHEETS GENERATED BY EXTENDED FOCUSING

(71) Applicant: THE BOARD OF REGENTS OF THE UNIVERSITY OF TEXAS SYSTEM, Austin, TX (US)

(72) Inventors: Reto P. Fiolka, Austin, TX (US); Kevin M. Dean, Austin, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 15/570,636

(22) PCT Filed: Apr. 26, 2016

(86) PCT No.: PCT/US2016/029329
§ 371 (c)(1),
(2) Date: Oct. 30, 2017

(87) PCT Pub. No.: WO2016/178856
PCT Pub. Date: Nov. 20, 2016

(65) Prior Publication Data
US 2018/0292321 A1    Oct. 11, 2018

Related U.S. Application Data

(60) Provisional application No. 62/273,918, filed on Dec. 31, 2015, provisional application No. 62/155,980, filed on May 1, 2015.

(51) Int. Cl.
*G01N 21/64* (2006.01)
*G02B 21/00* (2006.01)
(Continued)

(52) U.S. Cl.
CPC ....... *G01N 21/6458* (2013.01); *G02B 21/008* (2013.01); *G02B 21/0032* (2013.01);
(Continued)

(58) Field of Classification Search
CPC ...................................................... G02B 21/06
See application file for complete search history.

(56) References Cited

U.S. PATENT DOCUMENTS 5,479,252 A    12/1995   Worster et al.
6,098,031 A    8/2000    Svetkoff et al.
(Continued)

FOREIGN PATENT DOCUMENTS

CN    101893755    11/2010
CN    102122063    7/2011
(Continued)

OTHER PUBLICATIONS

Abrahamsson et al., "Fast multicolor 3D imaging using aberration-corrected multifocus microscopy," *Nature Methods*,. 2013, 10(1):60-63.
(Continued)

*Primary Examiner* — David P Porta
*Assistant Examiner* — Djura Malevic
(74) *Attorney, Agent, or Firm* — Polsinelli PC; Adam C. Rehm

(57) ABSTRACT

Light-sheet fluorescence microscopy (LSFM) affords highly parallelized 3D imaging with optical sectioning capability and minimal light exposure. However, using Gaussian beams for light-sheet generation results in a trade-off between beam waist thickness and the area over which the beam can approximate a light-sheet. Novel techniques for LSFM are disclosed that uses extended focusing and/or laser
(Continued)

line focuses to produce divergence free light-sheets with near diffraction-limited resolution and uniform intensity distribution.

20 Claims, 23 Drawing Sheets

(51) Int. Cl.
  *G02B 21/36* (2006.01)
  *G02B 21/16* (2006.01)
(52) U.S. Cl.
  CPC ......... *G02B 21/0076* (2013.01); *G02B 21/16* (2013.01); *G02B 21/367* (2013.01); *G01N 2021/6471* (2013.01); *G01N 2201/063* (2013.01); *G01N 2201/105* (2013.01)

(56) References Cited

U.S. PATENT DOCUMENTS

| | | | | |
|---|---|---|---|---|
| RE38,307 E | * | 11/2003 | Gustafsson | G02B 21/22 359/368 |
| 6,711,283 B1 | * | 3/2004 | Soenksen | G02B 21/002 382/133 |
| 6,903,347 B2 | * | 6/2005 | Baer | G02B 21/0056 250/458.1 |
| 7,297,961 B2 | * | 11/2007 | Kang | G02B 21/16 250/458.1 |
| 7,417,227 B2 | * | 8/2008 | Matsumoto | H01J 37/244 250/306 |
| 7,554,725 B2 | * | 6/2009 | Stelzer | G02B 21/06 359/385 |
| 7,787,179 B2 | * | 8/2010 | Lippert | G02B 21/06 359/385 |
| 7,801,352 B2 | * | 9/2010 | Uchiyama | G02B 21/367 382/133 |
| 8,115,806 B2 | * | 2/2012 | Osawa | G02B 21/06 348/61 |
| 8,351,120 B2 | * | 1/2013 | Deng | G02B 27/0012 348/241 |
| 8,441,633 B2 | * | 5/2013 | Truong | G01N 21/6408 356/301 |
| 8,514,488 B2 | | 8/2013 | Lucke et al. | |
| 8,792,162 B2 | * | 7/2014 | Lippert | G02B 21/0032 359/385 |
| 8,809,810 B2 | * | 8/2014 | Liu | G01N 21/6452 250/483.1 |
| 8,970,950 B2 | * | 3/2015 | Stelzer | G02B 21/06 359/385 |
| 8,978,984 B2 | * | 3/2015 | Hennick | G06K 7/10732 235/462.41 |
| 9,057,879 B2 | * | 6/2015 | Knebel | G02B 21/002 |
| 9,110,301 B2 | * | 8/2015 | Lippert | G02B 21/002 |
| 9,134,521 B2 | * | 9/2015 | Huisken | G02B 21/0048 |
| 9,217,665 B2 | * | 12/2015 | Santori | G01J 1/0407 |
| 9,305,956 B2 | * | 4/2016 | Pitts | H01L 27/14627 |
| 9,307,169 B2 | * | 4/2016 | Kodama | G01J 3/0208 |
| 9,500,849 B2 | * | 11/2016 | Lippert; Helmut | G02B 21/002 |
| 9,645,378 B2 | * | 5/2017 | Hilbert | G02B 21/002 |
| 9,658,443 B2 | * | 5/2017 | Broxton | G02B 21/367 |
| 9,678,323 B2 | * | 6/2017 | Orth | G02B 21/16 |
| 9,697,605 B2 | * | 7/2017 | Lippert | G02B 21/002 |
| 9,804,378 B2 | * | 10/2017 | Singer | G02B 27/0025 |
| 9,810,896 B2 | * | 11/2017 | Nishiwaki | G02B 21/367 |
| 9,829,691 B2 | * | 11/2017 | Otte | G02B 21/0032 |
| 10,018,819 B2 | * | 7/2018 | Iguchi | G02B 21/06 |
| 10,042,148 B2 | * | 8/2018 | Iguchi | G02B 21/006 |
| 10,048,482 B2 | * | 8/2018 | Pretorius | G02B 27/0025 |
| 10,067,328 B2 | * | 9/2018 | Ouchi | G02B 21/0092 |
| 10,095,018 B2 | * | 10/2018 | Ouchi | G02B 21/0092 |
| 10,114,207 B2 | * | 10/2018 | Ishiwata | G02B 21/361 |
| 2002/0001089 A1 | | 1/2002 | Price | |
| 2003/0218746 A1 | * | 11/2003 | Sambas | G01N 21/6428 356/318 |
| 2005/0089208 A1 | * | 4/2005 | Dong | G02B 21/241 382/133 |
| 2005/0092934 A1 | * | 5/2005 | Kang | G02B 21/16 250/458.1 |
| 2006/0012872 A1 | * | 1/2006 | Hayashi | G01N 21/21 359/386 |
| 2006/0033987 A1 | * | 2/2006 | Stelzer | G02B 21/06 359/385 |
| 2006/0038144 A1 | * | 2/2006 | Maddison | G02B 21/367 250/559.05 |
| 2006/0088844 A1 | * | 4/2006 | Xu | C12Q 1/6825 435/6.12 |
| 2006/0197034 A1 | * | 9/2006 | Shirai | G01N 21/6428 250/458.1 |
| 2006/0274408 A1 | | 12/2006 | Lauer | |
| 2007/0035855 A1 | * | 2/2007 | Dickensheets | A61B 5/0068 359/819 |
| 2007/0058246 A1 | * | 3/2007 | Westphal | G02B 21/082 359/368 |
| 2007/0154938 A1 | * | 7/2007 | Oshida | G01N 21/6428 435/6.11 |
| 2007/0206097 A1 | * | 9/2007 | Uchiyama | G02B 21/367 348/207.99 |
| 2007/0206276 A1 | * | 9/2007 | Gugel | G02B 21/0076 359/385 |
| 2008/0117503 A1 | | 5/2008 | Reimer et al. | |
| 2008/0158551 A1 | | 7/2008 | Hess | |
| 2008/0185533 A1 | * | 8/2008 | Kimura | G02B 21/002 250/458.1 |
| 2009/0225413 A1 | * | 9/2009 | Stelzer | G02B 21/06 359/385 |
| 2009/0237765 A1 | * | 9/2009 | Lippert | G02B 21/06 359/213.1 |
| 2009/0242798 A1 | | 10/2009 | Bewersdorf et al. | |
| 2010/0111768 A1 | * | 5/2010 | Banerjee | C12Q 1/6869 422/82.08 |
| 2010/0148092 A1 | * | 6/2010 | Zheng | G01N 21/6452 250/459.1 |
| 2010/0328657 A1 | * | 12/2010 | Dholakia | G01J 3/10 356/301 |
| 2011/0036996 A1 | * | 2/2011 | Wolleschensky | G01N 21/6458 250/459.1 |
| 2011/0115895 A1 | * | 5/2011 | Huisken | G02B 21/0048 348/79 |
| 2011/0122488 A1 | | 5/2011 | Truong et al. | |
| 2011/0134521 A1 | | 6/2011 | Truong et al. | |
| 2012/0026311 A1 | * | 2/2012 | Ouchi | G02B 21/06 348/79 |
| 2012/0049087 A1 | * | 3/2012 | Choi | G01N 21/4795 250/459.1 |
| 2012/0098949 A1 | * | 4/2012 | Knebel | G02B 21/002 348/79 |
| 2012/0200693 A1 | * | 8/2012 | Lippert | G02B 21/002 348/79 |
| 2013/0130937 A1 | * | 5/2013 | Sun | G01N 21/6452 506/16 |
| 2013/0222547 A1 | | 8/2013 | Van Rooyen et al. | |
| 2013/0228705 A1 | * | 9/2013 | Nishikawa | G01N 15/1463 250/459.1 |
| 2013/0229665 A1 | * | 9/2013 | Nomura | G02B 21/06 356/601 |
| 2013/0286181 A1 | * | 10/2013 | Betzig | H04N 7/18 348/79 |
| 2014/0042339 A1 | * | 2/2014 | Stelzer | G02B 21/06 250/459.1 |
| 2014/0104407 A1 | * | 4/2014 | Ouchi | G02B 21/0092 348/79 |
| 2014/0240457 A1 | | 8/2014 | Xia | |
| 2015/0022881 A1 | * | 1/2015 | Loza Alvarez | G02B 21/06 359/385 |
| 2015/0153560 A1 | * | 6/2015 | Lippert | G02B 21/367 348/79 |
| 2015/0168702 A1 | * | 6/2015 | Harris | G02B 21/08 850/30 |
| 2015/0168706 A1 | * | 6/2015 | Schweinitzer | G02B 21/367 348/80 |

(56) References Cited

U.S. PATENT DOCUMENTS

| | | | | |
|---|---|---|---|---|
| 2015/0177506 A1* | 6/2015 | Nishiwaki | ............ | G02B 21/367 348/46 |
| 2015/0185463 A1* | 7/2015 | Ohki | ............ | G02B 21/06 348/79 |
| 2015/0198794 A1* | 7/2015 | Rondeau | ............ | G02B 21/0048 359/390 |
| 2015/0253560 A1* | 9/2015 | Otte | ............ | G02B 21/0032 359/385 |
| 2015/0355449 A1* | 12/2015 | Orth | ............ | G02B 21/16 348/79 |
| 2015/0362713 A1* | 12/2015 | Betzig | ............ | G02B 21/0064 250/459.1 |
| 2016/0070091 A1* | 3/2016 | Hufnagel | ............ | G02B 21/0076 359/385 |
| 2016/0124201 A1* | 5/2016 | Kikuchi | ............ | G02B 21/16 359/385 |
| 2016/0124203 A1* | 5/2016 | Ryu | ............ | G02B 21/06 348/79 |
| 2016/0131885 A1* | 5/2016 | Nakayama | ............ | G01N 21/6428 250/458.1 |
| 2016/0139394 A1* | 5/2016 | Taniguchi | ............ | G02B 21/24 359/385 |
| 2016/0154236 A1* | 6/2016 | Siebenmorgen | ............ | G02B 21/0032 359/385 |
| 2016/0170195 A1* | 6/2016 | Siebenmorgen | ............ | G02B 21/0032 359/385 |
| 2016/0291304 A1* | 10/2016 | Singer | ............ | G02B 27/0025 |
| 2016/0305883 A1* | 10/2016 | Betzig | ............ | G02B 21/16 |
| 2016/0306154 A1* | 10/2016 | Iguchi | ............ | G02B 21/06 |
| 2016/0320600 A1* | 11/2016 | Dake | ............ | G02B 21/06 |
| 2016/0334613 A1* | 11/2016 | Ishiwata | ............ | G02B 21/361 |
| 2017/0139193 A1* | 5/2017 | Iguchi | ............ | G02B 21/006 |
| 2018/0088308 A1* | 3/2018 | Liu | ............ | G02B 21/367 |

FOREIGN PATENT DOCUMENTS

| | | |
|---|---|---|
| CN | 201974574 | 9/2011 |
| CN | 102226852 | 10/2011 |
| CN | 102540476 | 7/2012 |
| CN | 202351503 | 7/2012 |
| CN | 102749834 | 10/2012 |
| CN | 103099635 | 5/2013 |
| CN | 103278919 | 9/2013 |
| CN | 103411936 | 11/2013 |
| CN | 103424861 | 12/2013 |
| DE | 3422143 | 12/1985 |
| DE | 19824460 | 12/1999 |
| DE | 102004034997 | 2/2006 |
| DE | 112012002445 | 4/2014 |
| EP | 0795770 | 9/1997 |
| EP | 1617258 | 1/2006 |
| EP | 1617267 | 1/2006 |
| EP | 1617375 | 1/2006 |
| EP | 1918756 | 5/2008 |
| EP | 1317685 | 8/2008 |
| FI | 81211 | 5/1990 |
| FR | 2754070 | 4/1998 |
| GB | 2416261 | 1/2006 |
| GB | 2416440 | 1/2006 |
| GB | 2416449 | 1/2006 |
| HU | 200500143 | 7/2006 |
| JP | H08-094938 | 4/1996 |
| JP | H10-160740 | 6/1998 |
| JP | 2001-272346 | 10/2001 |
| JP | 2014-026194 | 2/2014 |
| KR | 20100033047 | 3/2010 |
| KR | 20140068359 | 6/2014 |
| TW | 201341845 | 10/2013 |
| WO | WO 2016/054474 | 4/1916 |
| WO | WO 99/53355 | 10/1999 |
| WO | WO 02/37157 | 5/2002 |
| WO | WO 03/002972 | 1/2003 |
| WO | WO 2007/045499 | 4/2007 |
| WO | WO 2008/092107 | 7/2008 |
| WO | WO 2010/108042 | 9/2010 |

OTHER PUBLICATIONS

International Search Report and Written Opinion issued in International Patent Application No. PCT/US2017/027093, dated Aug. 22, 2017.
Mohan et al., "Three Dimensional Fluorescence Imaging Using Multiple Light-Sheet Microscopy," PLoS One, 2014, 9(6):e96551.
Aguet et al. (2013) Advances in Analysis of Low Signal-to-Noise Images Link Dynamin and AP2 to the Functions of an Endocytic Checkpoint. Developmental Cell 26(3):279-291.
Ahrens et al. (2013) Whole-brain functional imaging at cellular resolution using light-sheet microscopy. Nature Methods 10(5):413-420.
Botcherby et al. (2012) Aberration-free three-dimensional multiphoton imaging of neuronal activity at kHz rates. Proceedings of the National Academy of Sciences 109(8):2919-2924.
Botcherby et al. (2007) Aberration-free optical refocusing in high numerical aperture microscopy. Optics Letters 32(14):2007-2009.
Butcher et al. (2009) A tense situation: forcing tumour progression. Nature Reviews Cancer 9(2):108-122.
Chen et al. (2014) Lattice light-sheet microscopy: Imaging molecules to embryos at high spatiotemporal resolution. Science 346(6208):1257998.
Dean et al. (2014) Uniform and scalable light-sheets generated by extended focusing. Optics Express 22(21):26141.
Fahrbach et al. (2010) A line scanned light-sheet microscope with phase shaped self-reconstructing beams. Optics Express 18(23):24229.
Friedl et al. (2009) Plasticity of cell migration: a multiscale tuning model. The Journal of Cell Biology 188(1):11-19.
Friedl et al. (1997) Migration of highly aggressive MV3 melanoma cells in 3-dimensional collagen lattices results in local matrix reorganization and shedding of alpha2 and beta1 integrins and CD44. Cancer research 57(10):2061-2070.
Gao et al. (2012) Noninvasive Imaging beyond the Diffraction Limit of 3D Dynamics in Thickly Fluorescent Specimens. Cell 151(6): 1370-1385.
Gebhardt et al. (2013) Single-molecule imaging of transcription factor binding to DNA in live mammalian cells. Nature Methods 10(5):421-426.
International Preliminary Report on Patentability in International Application No. PCT/US2016/029329 dated Nov. 16, 2017.
International Search Report and Written Opinion in International Application No. PCT/US2016/029329 dated Aug. 17, 2016.
Jaqaman et al. (2008) Robust single-particle tracking in live-cell time-lapse sequences. Nature Methods 5(8):695-702.
Keller (2013) Imaging Morphogenesis: Technological Advances and Biological Insights. Science 340(6137):1234168.
Krahn et al. (2006) Fluorescently labeled collagen binding proteins allow specific visualization of collagen in tissues and live cell culture. Analytical Biochemistry 350(2):177-185.
Martin et al. (2014) A Growth Factor-Induced, Spatially Organizing Cytoskeletal Module Enables Rapid and Persistent Fibroblast Migation. Developmental Cell 30(6):701-716.
Mendez et al. (2010) Vimentin induces changes in cell shape, motility, and adhesion during the epithelial to mesenchymal transition. The FASEB Journal 24(6):1838-1851.
Planchon et al. (2011) Rapid three-dimensional isotropic imaging of living cells using Bessel beam plane illumination. Nature Methods 8(5):417-423.
Shaner et al. (2008) Improving the photostability of bright monomeric orange and red fluorescent proteins. Nat Methods 5(6):545-551.
Shaner et al. (2013) A bright monomeric green fluorescent protein derived from Branchiostoma lanceolatum. Nature Methods 10(5):407-409.
Vettenburg et al. (2014) Light-sheet microscopy using an Airy beam. Nature Methods 11(5):541-544.

(56) References Cited

OTHER PUBLICATIONS

Wang et al. (2014) Long-Range Force Transmission in Fibrous Matrices Enabled by Tension-Driven Alignment of Fibers. Biophysical Journal 107(11):2592-2603.

Wu et al. (2013) Spatially isotropic four-dimensional imaging with dual-view plane illumination microscopy. Nature Biotechnology 31(11):1032-1038.

Zong et al. (2015) Large-field high-resolution two-photon digital scanned light-sheet microscopy. Cell Research 25:254-257.

\* cited by examiner

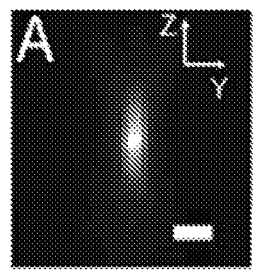 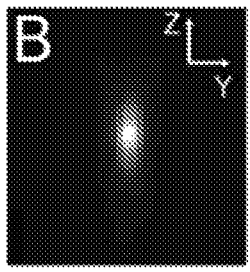 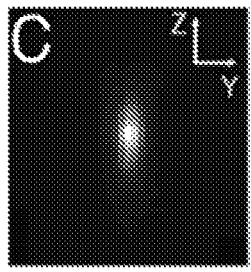 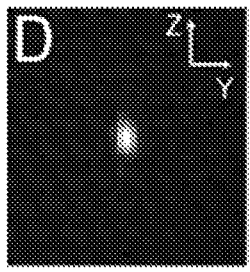
FIG. 6A    FIG. 6B    FIG. 6C    FIG. 6D
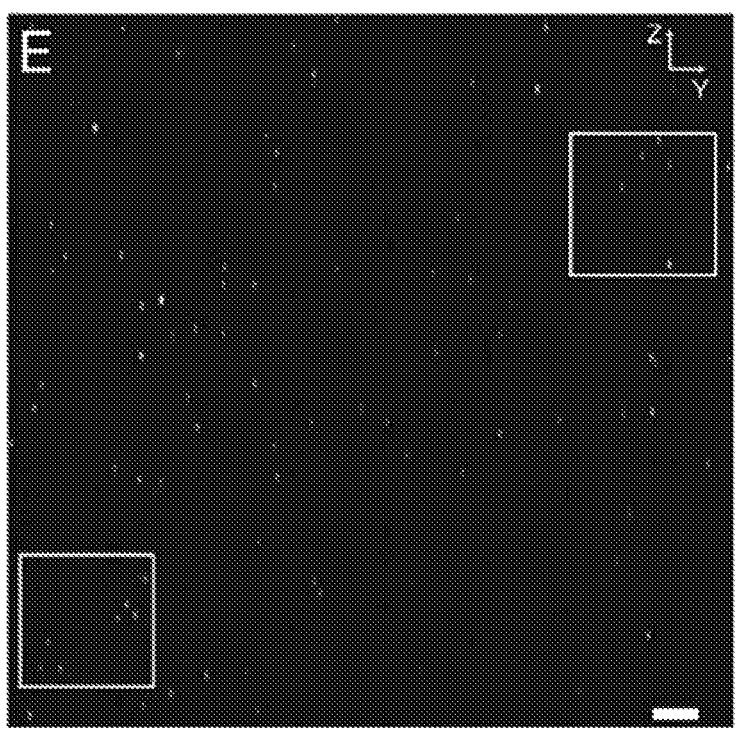
FIG. 6E
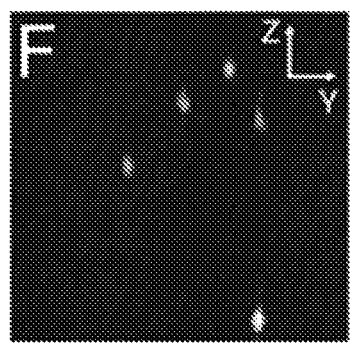
FIG. 6F
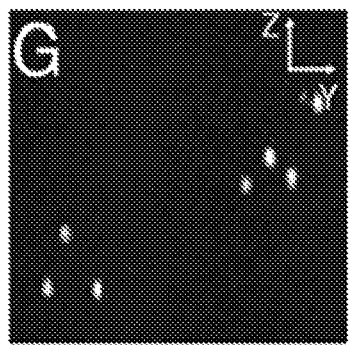
FIG. 6G

2210

2220

2230

UNIFORM AND SCALABLE LIGHT-SHEETS GENERATED BY EXTENDED FOCUSING

CLAIM OF PRIORITY

The present application is a national phase application under 35 U.S.C. § 371 of International Application No. PCT/US2016/029329, filed Apr. 26, 2016, which claims the benefit of U.S. Provisional Patent Application No. 62/155,980, filed May 1, 2015, entitled "UNIFORM AND SCALABLE LIGHT-SHEETS GENERATED BY EXTENDED FOCUSING," and claims the benefit of U.S. Provisional Patent Application No. 62/273,918, filed Dec. 31, 2015, entitled "UNIFORM AND SCALABLE LIGHT-SHEETS GENERATED BY EXTENDED FOCUSING." The foregoing applications are incorporated by reference in their respective entireties.

FIELD OF INVENTION

The present disclosure is generally related to light-sheet fluorescence microscopy (LSFM), and more particularly to LSFM techniques that use extended focusing or a laser line focus to generate images.

BACKGROUND

Imaging of dynamic three-dimensional sub-cellular processes requires high spatiotemporal resolution combined with low phototoxicity. In some applications, the imaging may be performed within a native or biomimetic context (e.g., in vivo, or within a reconstituted extracellular matrix). Widefield epifluorescence microscopy offers rapid data acquisition, limited only by signal flux and camera framerate, but fails to provide three-dimensional optical sectioning. In contrast, confocal microscopy rejects out-of-focus fluorescence and enables true 3D imaging, but laser scanning substantially decreases the temporal resolution, degrades signal to noise, and is often accompanied by nonlinear photodamage mechanisms.

Light-sheet fluorescence microscopy (LSFM) provides an alternative imaging technology that overcomes many of the challenges faced by widefield and confocal microscopy. In its simplest form, LSFM consists of excitation and detection objectives placed orthogonally, whereby a sample is illuminated from a low numerical aperture (low-NA) excitation objective with a long depth-of-focus line-shaped (e.g., shaped with a cylindrical lens) or laterally scanned Gaussian beam. The goal of LSFM is to confine the excitation power to a focal plane of the detection objective so as to avoid out-of-focus fluorescence and to lower the overall light exposure in the 3-dimensional (3D) imaging process which includes scanning the excitation beam in the Z-direction synchronously with the focal plane of the detection objective to obtain volumetric data sets with near beam-waist-limited axial resolution.

LSFM is particularly useful for imaging applications that require large field of views at moderate spatial resolution (on the order of a couple of microns). For example, LSFM has provided significant insight into zebrafish embryogenesis and neuronal dynamics. Sub-cellular imaging, however, requires sub-micron, preferably diffraction-limited, axial resolution, where beam divergence significantly limits the field of view. In an attempt to increase the field of view, Bessel-Gauss beams (e.g., a Bessel beam of finite length) have been adopted. However, Bessel-Gauss beams have concentric side lobes that significantly degrade the axial confinement of the illumination, necessitating optical-sectioning structured illumination (OS-SIM), super-resolution SIM (SR-SIM), deconvolution, or confocal detection to reject out-of-focus light. With 2-photon excitation, these side lobe structures can be suppressed significantly. However, 2-photon excitation has limited multicolor capability because it requires spectrally resolvable fluorochromes with overlapping 2-photon absorption cross-sections, emission wavelength tuning of the Ti-sapphire laser, or complex and expensive optical parametric oscillators. Furthermore, photodamage scales non-linearly with excitation intensity. Thus, 2-photon excitation generally increases cellular phototoxicity and photobleaching compared to 1-photon imaging.

SUMMARY

Various embodiments of imaging systems and LSFM techniques that can overcome the tradeoff between axial resolution and field of view inherent to lightsheets produced by Gaussian beams are disclosed. In a first embodiment, an imaging system uses extended focusing to produce uniform, divergence free light-sheets with near diffraction-limited resolution. The imaging system generates an extended focus by incoherently superimposing a tightly focused Gaussian beam in the axial direction. The imaging system may use an acousto-optical or electro-optical focus tunable lens that sinusoidally sweeps the Gaussian beam along the optical axis at hundreds of kHz, generating a time averaged extended focus. The resulting pencil of light is scanned laterally with a galvanometric mirror to synthesize a digital light-sheet. Active pixels of a camera are synchronized with the sweep of the line beam to reduce out-of-focus blur, enabling generation of a virtual confocal slit aperture. In a second embodiment, an imaging system generates a laser line focus that is scanned in the axial direction (i.e., the propagation direction of the beam), and active pixels of a camera are synchronized so that only portions of emitted fluorescence corresponding to a region of the laser line focus that is sharp are being acquired, whereas virtually all blur in front of and behind the laser line focus is discarded.

This disclosure includes embodiments of methods, computer-readable storage media, and apparatuses for imaging an object using detected fluorescence emissions generated in response to illumination of the object using a pencil of light or a laser line focus. In an embodiment, method includes generating a beam of light, and processing the beam of light to produce a processed beam of light. In an embodiment, the processed beam of light may be a Gaussian beam. In an additional or alternative embodiment, the processed beam of light may be a laser line focus. The method may include illuminating an object using the processed beam of light. In an embodiment, illuminating the object may include scanning the processed beam of light across at least a portion of the object. The method may include capturing image data representative of fluorescence emitted by the object during the scanning, and generating an image representative of the object based on the captured image data. In an embodiment, post-processing may be applied to the image to reduce blur and to increase the resolution of the image, such as when the Gaussian beam is used to illuminate the object. In an additional or alternative embodiment, the image may be generated at high-resolution without requiring post-processing, such as when the line focus is used.

In an additional or alternative embodiment, a computer-readable storage medium stores instructions that, when executed by a processor, cause the processor to perform operations for generating an image of an object using detected fluorescence emissions generated in response to illumination of the object using a Gaussian beam or a laser line focus. In an embodiment, the operations include generating a beam of light, and processing the beam of light to produce a processed beam of light. In an embodiment, the processed beam of light may be a Gaussian beam. In an additional or alternative embodiment, the processed beam of light may be a laser line focus. The method may include illuminating an object using the processed beam of light. In an embodiment, illuminating the object may include scanning the processed beam of light across at least a portion of the object. The operations may include capturing image data representative of fluorescence emitted by the object during the scanning, and generating an image representative of the object based on the captured image data. In an embodiment, post-processing may be applied to the image to reduce blur and to increase the resolution of the image, such as when the Gaussian beam is used to illuminate the object. In an additional or alternative embodiment, the image may be generated at high-resolution without requiring post-processing, such as when the line focus is used.

In another additional or alternative embodiment, an apparatus includes a light source configured to generate a beam of light, and a processing component configured to process the beam of light to produce a processed beam of light. In an embodiment, the processed beam of light may be a Gaussian beam, and the processing component may include one or more irises, modulators, lenses, pinholes, or a combination thereof. In an additional or alternative embodiment, the processed beam of light may be a laser line focus, and the processing component may include a cylindrical lens or other component configured to focus the beam of light in a single dimension. The apparatus may include an excitation objective configured to illuminate the object using the processed beam of light. In an embodiment, illuminating the object may include scanning the processed beam of light across at least a portion of the object. In an embodiment, the apparatus may include a camera configured to capture image data representative of fluorescence emitted by the object during the scanning, and to generate an image representative of the object based on the captured image data. In an embodiment, the camera (or another component of the apparatus, such as a central processing unit (CPU) or a graphics processing unit (GPU) of the apparatus) may apply post-processing to the image to reduce blur and to increase the resolution of the image, such as when the Gaussian beam is used to illuminate the object. In an additional or alternative embodiment, the camera (or another component of the apparatus, such as the CPU or the GPU of the apparatus) may generate the image at high-resolution without requiring post-processing, such as when the laser line focus is used.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 6A is an illustration of a single sub-diffraction nanosphere using a standard camera-based widefield imaging technique and illumination by a light sheet obtained by extended focusing;

FIG. 6B is an illustration of a point spread function (PSF) of a sub-diffraction nanosphere imaged with a 480 nm virtual confocal slit and illumination by a light sheet obtained by extended focusing;

FIG. 6C is an illustration of a point spread function (PSF) of a sub-diffraction nanosphere imaged with a 160 nm virtual confocal slit and illumination by a light sheet obtained by extended focusing;

FIG. 6D is an illustration of a linearly deconvolved sub-diffraction nanosphere showing near-isotropic axial and lateral resolution;

FIG. 6E is an illustration of a YZ maximum intensity projection of a 3D bead data set using a virtual slit aperture of 480 nm and linear deconvolution with Wiener filtering;

FIG. 6F is a first illustration that shows that an imaging system of embodiments maintains shift-invariant imaging throughout an imaging volume;

FIG. 6G is a second illustration that shows that an imaging system of embodiments maintains shift-invariant imaging throughout an imaging volume;

DETAILED DESCRIPTION

Figure 1:
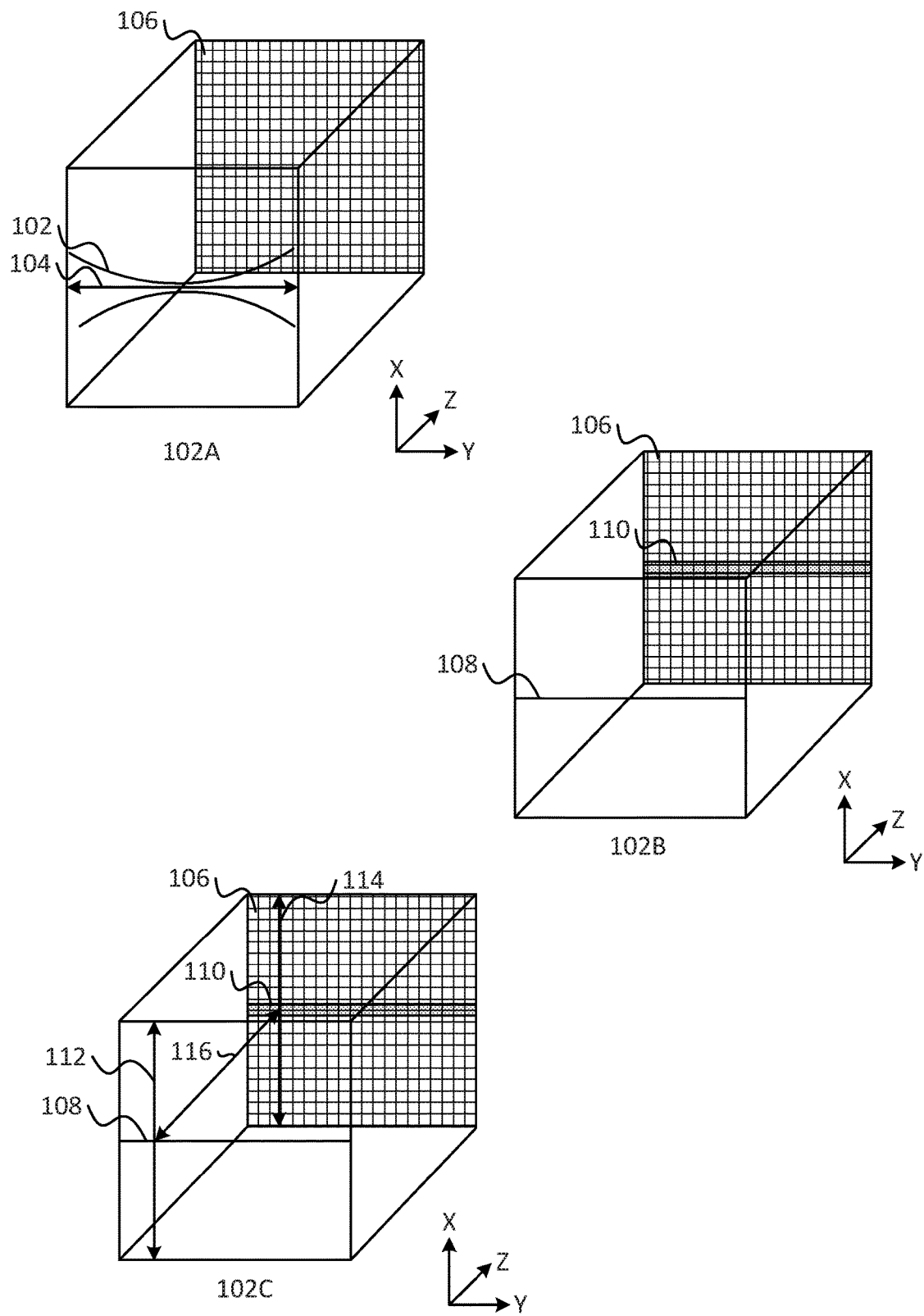
FIG. 1 is a first exemplary embodiment of a technique for generating an image using an extended depth of focus technique.

Systems, methods, and computer-readable storage media for generating 3D images of an object using LSFM techniques according to the present disclosure are shown. Referring to FIG. 1, a first exemplary embodiment of a technique for generating an image using an extended depth-of-focus technique is shown. At 102A, the waist of a Gaussian beam 102 is axially scanned back and forth across an object to be imaged, as indicated by the arrow 104. In an embodiment, the Gaussian beam 102 may propagate through the object axially along the y-axis. In an embodiment, the Gaussian beam 102 may be generated from a beam of light emitted by a light source (e.g., a laser, etc.) of a microscope. The microscope may include components (e.g., lenses, irises, pinholes, etc.) configured to process the beam of light to form the Gaussian beam 102. The Gaussian beam 102 may be provided to an excitation objective of the microscope, where the excitation objective is configured to illuminate the object in an axial direction using the Gaussian beam 102. The illumination may cause fluorescence emissions to be emitted by the object. The microscope may include a detection objective coupled to a camera. In an embodiment, the detection objective and the camera may be oriented orthogonally to the propagation direction (i.e., the detection objective and the camera may be oriented along the z-axis). The detection objective may detect the fluorescence emissions from the object, and provide the emissions to the camera. In FIG. 1, pixels 106 are shown. The pixels 106 may correspond to image data captured by the camera during the imaging process.

For example, as the Gaussian beam 102 is axially scanned back and forth across the object, as shown at 102A, a pencil of light 108 may be formed, as shown at 102B. The pencil of light 108 may illuminate a portion of the object and the camera may capture image data corresponding to the illuminated portion of the object, as indicated at 110. In an embodiment, the Gaussian beam 102 may be rapidly scanned back and forth across the object for a period of time, and, thus, the pencil of light 108 may illuminate the object during the period of time. The camera may capture image data corresponding to the illuminated portion of the object such that image data corresponding to the row of pixels, indicated at 110, is captured. For example, the illumination of the object may cause fluorescence to be emitted by the object at a region illuminated by the pencil of light 108. During the period of time, the camera may capture a time averaged representation of the fluorescence emitted by the object at the row of pixels corresponding to the region 110.

At 102C, the pencil of light 108 may be moved in a direction orthogonal to the scanning direction at the conclusion of the period of time, as indicated at 112. For example, in 102C, the line 112 indicates that, after capturing image data for a particular axial scan of the object using the pencil of light 108, the pencil of light 108 may be moved up or down along the X-axis so that additional portions of the object may be illuminated, and thus, the corresponding region or row of pixels captured by the camera (e.g., the region 110) may also move up or down in a synchronized manner with the movement of the pencil of light 108. This may continue until the entire object (or a portion/region of interest) has been scanned using the pencil of light 108, and imaged using the camera.

During the scanning of the object, the camera may capture a data set representative of the fluorescence emitted by the object along the dimension of the scan (e.g., a 2 dimensional (2D) cross-section of the object in the xy plane). For example, in FIG. 1, the object is illuminated along a first direction (e.g., a y-axis), and the scanning in the first dimension may include scanning the pencil of light back and forth rapidly along a second direction (e.g., a x-axis). Thus, an image captured by the camera may correspond to a 2D cross section of the object in the first and second directions (e.g., a 2D image of a slice of the object in the xy plane).

After capturing a first image, the illumination may then be scanned across the object at a different plane, as indicated by the line 112. Thus, subsequent images may be captured by scanning the object in the xy plane at different positions in the third direction (e.g., different positions along the z-axis), as indicated by the arrow 116. As a result of the scanning, the camera may capture a series of 2D images that are representative of various cross-sections of the object. The series of 2D images may then be combined to form a 3D image of the object. The 3D image may require post-processing to remove or decrease blur and to increase the resolution of the 3D image. In an embodiment, the microscope may include a Z-galvo and an X-galvo to facilitate the scanning of the pencil of light across the object in the second and third directions. Additional aspects and advantages of the first exemplary embodiment are described below with reference to FIGS. 2-10.

Figure 2:
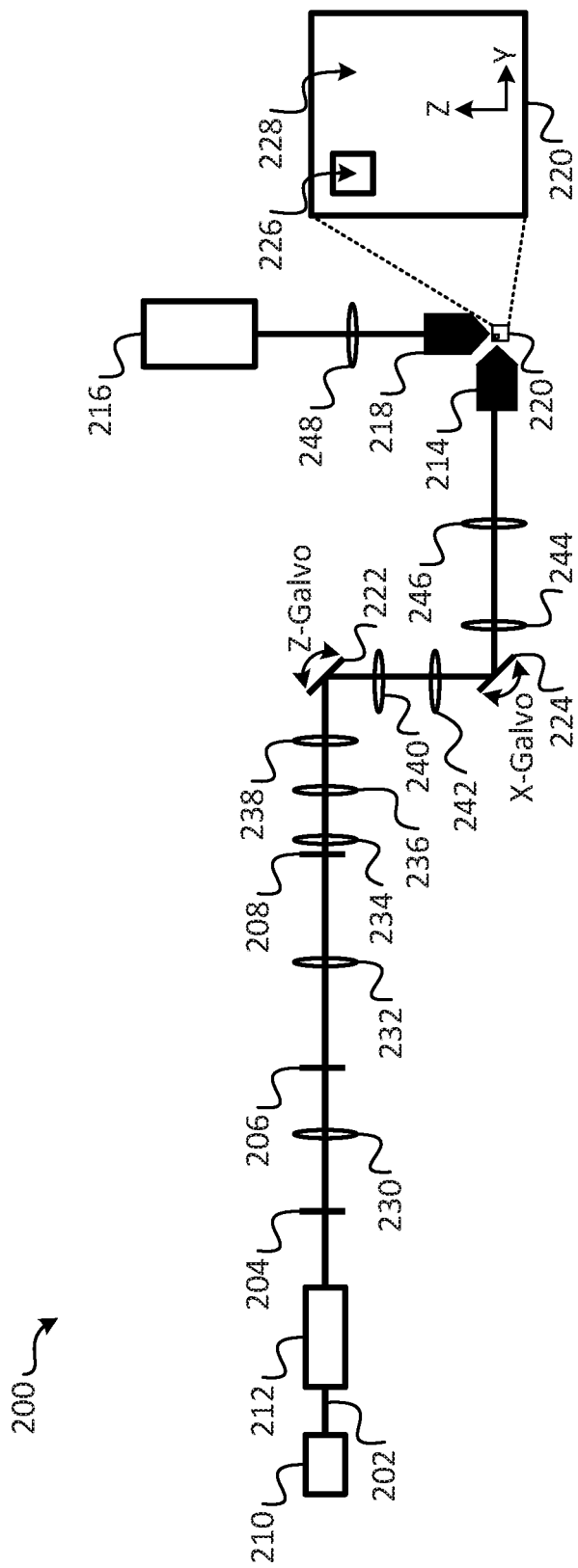
FIG. 2 is a schematic diagram illustrating an embodiment of an imaging system according to the present disclosure.

Referring to FIG. 2, a schematic diagram illustrating a first embodiment of an imaging system according to the present disclosure is shown as an imaging system 200. As shown in FIG. 2, the imaging system 200 includes a light source 210, an intensity modulator 212, an excitation objective 214, a camera 216, a detection objective 218, a first iris 204, a spatial filter 206, a second iris 208, and a plurality of lenses 230-248. It is noted that the particular arrangement and configuration of the imaging system 1200 is provided for purposes of illustration, rather than by way of limitation, and that other arrangements and configurations of imaging systems may be used in accordance with the embodiments disclosed herein. The imaging system 200 may be used to generate images of an object 220. In an embodiment, the images may be 3D images, and may be generated from 3D data sets captured by the imaging system 200, as described in more detail below.

In an embodiment, the imaging system 200 may be configured to operate under the control of a computing system (not shown in FIG. 2). For example, the computing system may include a processor configured to control the operations of the imaging system 200. In an embodiment, the processor may include a central processing unit executing instructions stored in a memory of the computing system, where the instructions, when executed by the processor, cause the processor to perform the operations described in connection with the imaging system 200 with reference to FIGS. 2-10, and may use the technique briefly described above with reference to FIG. 1 or the second technique described below with reference to FIGS. 11-18. In an additional or alternative embodiment, the processor may include one or more application specific integrated circuits (ASICs), a field programmable gate array (FPGA), circuitry, or other hardware and/or software components configured to perform the operations described in connection with the imaging system 200 with reference to FIGS. 2-10, and may use the technique briefly described above with reference to FIG. 1 or the second technique described below with reference to FIGS. 11-18.

During operation, the light source 210 may be configured to generate a beam of light 202. In an embodiment, the light source 210 may be a laser. For example, the light source 210 may be 488 nm continuous wave laser. Components of the imaging system 100 may be configured to process the beam of light 202 to form a processed beam of light (e.g., a Gaussian beam, a laser focus, or a Bessel-Gauss beam). In an embodiment, the components configured to process the beam of light 202 to form the processed beam of light may include one or more of the lenses 230, 232, 234, one or more of the irises 204, 208, the spatial filter 206, and the intensity modulator 212. For example, the beam of light 102 may be provided from the light source 210 to the intensity modulator 212, where the intensity modulator 212 is configured to control the intensity of the beam of light 202. In an embodiment, the intensity modulator 212 may be an acousto-optic modulator (AOM), and the intensity of the beam of light 202 may be controlled by altering the drive voltage of the intensity modulator 212 (e.g., a drive voltage of the AOM). The intensity modulator 212 may control the intensity of the beam of light 202 by shuttering the beam of light 202. After shuttering the beam of light 202 via the intensity modulator 212, the beam of light 202 may be spatially isolated. The spatial isolation may be provided by projecting the beam of light 202 through a series of components including: 1) the first iris 204; 2) a first lens 230, 3) the spatial filter 206; 4) a second lens 232; and 5) the second iris 208. In an embodiment, the spatial filter 206 may be a 30 micron an aperture or pinhole. In an embodiment, the first lens 230 may have a focal length of 50 millimeters (mm), and the second lens 232 may have a focal length of 200 mm. In an embodiment, spatially filtering the beam of light 102 through the spatial filter 206 and the lenses 230, 232 having focal lengths of 50 mm and 200 mm, respectively, may magnify a diameter of the beam of light 202 to 3.4 mm ($e^{-2}$). It is noted that the specific arrangements and types of components used to process the beam of light 202 are provided for purposes of illustration, rather than by way of limitation, and that other arrangements and types of components may be configured to process a beam of light in accordance with the embodiments of the present disclosure.

The spatially filtered beam of light 202 may be directed into a third lens 234. In an embodiment, the third lens 234 may be an acoustically tunable lens, and may be driven at a target resonance. In an embodiment, the target resonance may be approximately 191 kilohertz (kHz). Temperature fluctuations may lead to shifts in the resonance up to 1 kHz. In an embodiment, the imaging system 200 may include a driver (not shown in FIG. 2) associated with the third lens 234. The driver may detect, or receive information representative of the temperature fluctuations, and may be configured to continuously adjust the resonant driving frequency of the third lens 234 based on the temperature fluctuations. Adjusting the resonant driving frequency of the third lens 234 responsive to detected fluctuations in the temperature may yield a useful aperture of up to 4 mm in diameter. In an additional or alternative embodiment, the third lens 234 may be an electro-tunable lens (ETL), or a spatial light modulator (SLM) that displays holograms that cause the wavefront to defocus. In an embodiment, the optical power of the third lens 234 may be changed over 8 diopters (e.g., +/−250 mm).

The third lens 234 may be imaged onto the Z-galvo 222 through a fourth lens 236 and a fifth lens 238. In an embodiment, the third lens 234 may be imaged onto the Z-galvo 222 through the lenses 236, 238 at a ratio of 1:1 (e.g., a focal length of the fourth lens 236 may be 50 mm, and a focal length of the fifth lens 238 may also be 50 mm). The Z-galvo 222 may be configured to relay the image onto the X-galvo 224. In an embodiment, the relayed image may be relayed from the Z-galvo 222 onto the X-galvo 224 with 1.5× magnification. For example, the image may be relayed from the Z-galvo 222 onto the X-galvo 224 through a sixth lens 240 and a seventh lens 242, where a focal length of the sixth lens 240 may be 50 mm, and a focal length of the seventh lens 242 may be 75 mm.

The X-galvo 224 may relay the image (e.g., the beam of light 102) to the excitation objective 214. In an embodiment, the image may be relayed from the X-galvo 224 to the excitation objective 214 via an eighth lens 244 and a ninth lens 246. In an embodiment, the eighth lens 244 may be a telecentric F-theta lens having a focal length of 60 mm, and the ninth lens 246 may be an infinity-corrected tube lens having a focal length of 200 mm. In an embodiment, the relaying of the image to the excitation objective 214 may include relaying the image onto a back focal plane (BFP) of the excitation objective 214. In an embodiment, the excitation objective 214 may be a long working distance water-dipping objective. In an embodiment, the excitation objective 214 may have a numerical aperture (NA) value of 0.8, where the NA value characterizes the range of angles over which the objective can accept or emit light. In an additional or alternative embodiment, excitation objectives having higher or lower NA values may also be used depending on a particular configuration and application of the imaging system 200.

Using the configuration of the imaging system 200 described above with respect to the path from the light source 210 to the excitation objective 214 (e.g., having an effective aperture of 4 mm for the third lens 234 and the further downstream magnification, as described above), it is possible to completely fill the back pupil plane of the excitation objective 214. It is noted that, although the excitation objective 214 is described above as having an NA value of 0.8, in additional or alternative embodiments, the excitation objective may have a higher or lower NA value. For example, during tests of a microscope configured as illustrated and described with reference to FIG. 2, aberrations were observed that restricted the excitation objective to an NA value of 0.6, which corresponds to a diameter of 15 mm at the BFP of the excitation objective 214.

The effective axial focus change provided by the configuration of the path from the light source 210 to the excitation objective 214 may be estimated according to:

$$\delta Y = \frac{\eta * FL3}{M^2 * FL_{TAGMIN}} - \frac{\eta * FL3}{M^2 * FL_{TAGMAX}}, \qquad \text{Equation 1}$$

where FL3 is the focal length of third lens 234, M is the magnification from the sample plane to the intermediate image plane inside the telescope formed by the lenses 234, 236, q is the refractive index of an immersion medium, and $FL_{TAGMIN}$ and $FL_{TAGMAX}$ are the minimal and maximal focal lengths for the third lens 234, respectively. Simulations indicate that the effective axial focus change provided by the configuration of the path from the light source 210 to the excitation objective 214 results in an axial focus sweep over 262 microns.

The excitation objective 214 may be configured to project the beam of light 202 onto the object 220 to illuminate the object 220. In an embodiment, the object 220 may be include an element to be imaged (e.g., an organic or inorganic substance) using the imaging system 200. In an embodiment, the object 220 may be formed using a mold. For example, the object 220 may be formed as a cube by casting the element to be imaged in a first substance, where the cube is casted onto a holder. In an embodiment, the first substance may be agarose, and the molding process may result in an ultra-pure 2% agarose cube. The holder may be dimensioned and sized to engage an object interface (not shown in FIG. 1). The object interface, when engaged with the holder, may retain the object 220 in a desired position and orientation such that the imaging of the object using the imaging system 200 may be performed. In an embodiment, the object interface may further facilitate translation of the object 220 along one or more dimensions, such as to facilitate imaging of different portions of the object 220. In an embodiment, the translation of the object 220 may be facilitated using a manual XYZ stage. In an additional or alternative embodiment, the translation of the object 220 may be facilitated using the computing system described above. For example, translation of the object 220 may be facilitated by an XYZ stage that is programmatically controlled by a processor. In an embodiment, the element to be imaged may be cast into a reservoir within the cube. For example, in FIG. 2, the object 220 has been cast to include a first portion 226 and a second portion 228. The first portion 226 includes a collagen gel that has the element to be imaged disposed therein, and the second portion 228 is formed from an agarose gel. The first portion 226 may be generated by casting the agarose gel in a mold and inserting a peg into the volume represented by the first portion 226 to create a void within the agarose, and then removing the peg once the agarose has solidified. After removal of the peg, the element to be imaged may be inserted into the void left after removal of the peg, where the element may be mixed with a 2% collagen gel. It is noted that other techniques for preparing the object 220 may be used, and that using different substances to form the object 220 is not required. For example, in an additional or alternative embodiment, the element to be imaged may be placed onto a coverslip. In an embodiment, the coverslip may be mounted at 45 degrees relative to the two objectives.

As shown in FIG. 2, the detection objective 218 is placed orthogonally to the excitation objective 214. In an embodiment, the detection objective 118 may be a long working distance water-dipping objective. The detection objective 218 may have an NA value of 0.8, however, detection objectives having higher or lower NA values may also be used depending on a particular configuration and application of the imaging system 200. During operation, the detection objective 218 may be synchronously scanned with the Z-galvo using a long travel range piezo actuator, and the scanning may detect fluorescence emissions emitted from the object 220 in response to illumination by the excitation objective 214. The fluorescence emissions may be filtered using a filter (not shown in FIG. 2) to produce filtered fluorescence emissions. In an embodiment, the filter may be a long 488 nm long-pass filter. The filtered fluorescence emissions may be provided to a tenth lens 248 that may image the filtered fluorescence emissions onto an active area (e.g., the region 110 of active pixels of FIG. 1) of the camera 216. In an embodiment the tenth lens 248 maybe by an infinity-corrected tube lens. In an embodiment, the camera may be a scientific complementary metal-oxide-semiconductor (sCMOS) camera.

In an embodiment, the camera 216 may operate according to camera integration period (e.g., a 20 ms camera integration period). With the third lens 234 operating at 191 kHz and (512 by 512 region of interest) each pixel row is illuminated approximately 15 times. During the illumination, the camera captures and/or generates a uniform time-averaged line illumination (e.g., an image of a slice of the object 220 corresponding to the pixel row that is illuminated). In an embodiment, synchronization of the laser shuttering (e.g., by the intensity modulator 212), image acquisition, galvo sweeps, and piezo scanning, may be controlled by the computing system.

By operating the imaging system 200 as described above, the limitations of 1-photon based LSFM may be overcome. For example, through the use of extended focusing (e.g., capturing time-averaged illumination of each illuminated pixel row of the object 220) uniform, divergence free light-sheets having near diffraction-limited resolution may be produced. The extended focus is facilitated by incoherently superimposing a diffraction-limited laser focus in the axial direction. In an embodiment, images of the object 220 may be formed as 3D images by capturing a plurality of time-averaged extended focus slices of the object 220 by periodically traversing the pencil of light (e.g., a laser focus with extended depth of focus) along one or more axes (e.g., an x axis and/or a z axis) to capture image data for a plurality of slices of the object 220, where each slice represents an incoherent superimposition of time-averaged illumination of a pixel row of the object 220 across a plane. The plurality of slices may then be combined to form a 3D image of the object 220.

In an embodiment, the imaging system 200 of FIG. 2 may use confocal detection scheme with a virtual slit to enable faster image acquisition than structured illumination, which requires multiple images per Z-plane. Further, the imaging system 200 of FIG. 2 may use linear deconvolution to remove the majority of the out-of-focus blur and to achieve greater axial resolution. In an additional or alternative embodiment, the imaging system 200 of FIG. 2 may, at least for sparse samples, use linear deconvolution alone (i.e., without the use of the confocal detection scheme with the virtual slit) to remove out-of-focus blur. It is noted that, for densely labeled samples, descanned confocal detection combined with linear deconvolution may provide optimal imaging performance, while for sparse sample, linear deconvolution alone may provide sufficient resolution.

Use of extended focusing in accordance with embodiments may be adopted by other LSFM modalities with little modification to improve illumination uniformity and increase the lateral field of view. These include LSFMs that implement Gaussian, line-shaped Gaussian, or Bessel-Gauss illumination. Further, it is noted that the imaging system 200 of FIG. 2, which uses a line focus instead of a focused spot to generate a light-sheet by extended focusing, has several advantages over existing imaging systems, namely: 1) only an axial scan by the focus tunable lens is needed to generate a light-sheet; 2) in contrast to the point illumination, the peak power delivered to the sample is decreased substantially as a larger area is simultaneously illuminated; and 3) a confocal aperture, whether virtual or physical, could capture the focused part of the line alone as it is scanned axially (Y-direction in coordinate system definitions used during the simulations described with reference to FIGS. 3A-9). These advantages enable out-of-focus blur, located before and after the focused line, to be completely rejected, enabling diffraction-limited performance to be obtained. Further, it is noted that the embodiments described herein may improve other imaging systems where beams are surrounded by side lobe structures. In an embodiment, the intensity modulator 212 may be configured to adjust the intensity of the beam of light 202 to account for the differences in intensity at the edges and center of the beam, as illustrated in FIGS. 5A-5F to provide for more uniform intensity.

From the foregoing, it has been shown that the imaging system 200 of embodiments provides improvements to imaging systems that utilize LSFM techniques. Further, it is noted that although particular advantages and improvements have been described, one of ordinary skill may readily recognize additional advantages provided by the configuration and operations of the imaging system 200 of FIG. 2. Additionally, it is noted that the imaging system 200 of FIG. 2 may be operated with a laser line focus (e.g., the laser line focus described with reference to FIGS. 11-18) instead of a tightly focused Gaussian beam by replacing the lens 136 (or another lens) with a cylindrical lens, or by using a mask (e.g., a mask placed in a Fourier plane, or close to a Fourier plane, or a mask placed next to the Focus tunable lens 134). Lens 134 may be an electro tunable lens that can change its effective focal length. Additional aspects of using a laser line focus to generate an image of an object are described below with reference to FIGS. 11-18.

Figure 3A:
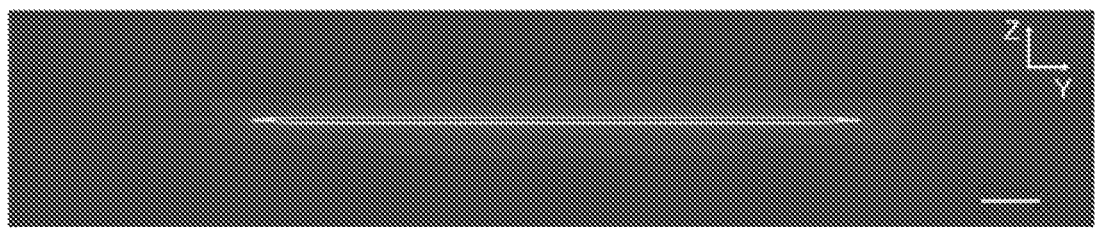
FIG. 3A is an illustration of an extended depth-of-focus Gaussian beam in a propagation direction.
Figure 3C:
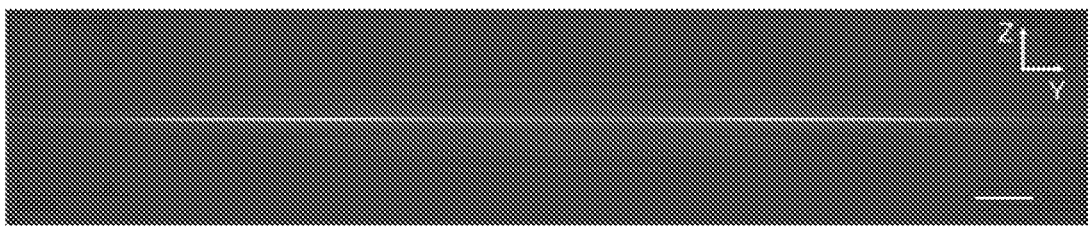
FIG. 3C is an illustration of an intensity distribution of a finite Bessel-Gauss beam in the propagation direction.
Figure 3B:
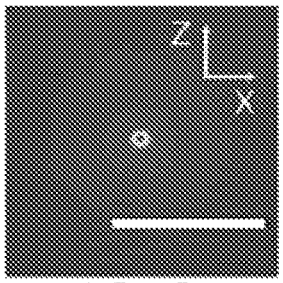
FIG. 3B is an illustration of a cross-section of the extended depth-of-focus Gaussian beam.

Referring to FIGS. 3A and 3B, exemplary intensity distributions for simulations of an incoherently extended focus in the axial and lateral dimensions, respectively, are shown. The extended focus was simulated using a uniform and circular electric field with a vacuum wavelength of 488 nm that was propagated through an ideal lens of NA=0.6, and forward propagated plane-by-plane to yield a 3D distribution of the electric field. During the simulations, polarization effects were ignored, and the scalar theory of light was applied. The squared modulus of the electric field provided the 3D intensity distribution of the laser focus. The lateral full width at half maximum (FWHM) of the laser focus was 389 nm, which was in good agreement with Abbe's resolution limit. The incoherent extended focus was obtained by convolving the simulated laser focus with a line 50- and 100-microns in length along the optical axis. The initial laser focus was computed in a large simulation volume of 204× 204×200 microns (2206×2006×541 voxels) to capture almost all out-of-focus blur and to minimize wrap-around effects of the convolution. The lateral FWHM of the beam was 465 nm, which increased by 19.5% compared to the initial laser focus. In FIGS. 3A and 3B, scale bars having lengths of 5 microns are shown in the lower right corner. FIG. 3A illustrates the extended depth-of-focus Gaussian beam in the propagation direction; and FIG. 3B illustrates a cross-section of the extended depth-of-focus Gaussian beam.

Figure 3D:
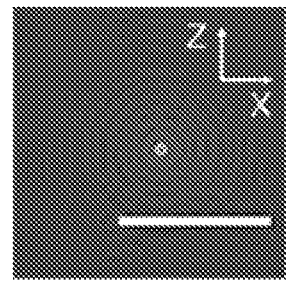
FIG. 3D is an illustration of cross section of an intensity distribution of a finite Bessel-Gauss beam.

Referring to FIGS. 3C and 3D, exemplary intensity distributions for simulations of Bessel-Gauss beams in the axial and lateral dimensions, respectively, are shown. The three-dimensional Bessel-Gauss beam was modeled in reciprocal space: voxels on a thin annulus (NA range 0.57 to 0.58) on a sphere were set to one whereas all other elements in a three-dimensional matrix were set to zero. A fast Fourier transform (FFT) of the matrix yielded the three-dimensional electric field in real space and the intensity distribution was obtained by taking the squared modulus of each voxel. An upper limit for the size of the matrix for which the three-dimensional FFT was computed was chosen to be M×M× P=2300×2300×1060, where M is the array size along the lateral dimensions and P is the array size in the propagation direction of the beam. The radius of the sphere, which is equal to the wavenumber of light, was set to 580 voxels. The reciprocal voxel size may be given by $\delta k = \eta/(\lambda r)$, where $\eta$ is the refractive index of water (1.333), $\lambda$ is the vacuum wavelength of light, and r is the radius of the sphere. The real space voxel size may be computed as $\delta xy = 1/(M\delta k) = 92.5$ nm and $\delta z = 1/(P \cdot \delta k) = 183.5$ nm, which facilitates Nyquist sampling of the beam in the respective dimensions. The lateral FWHM of the Bessel-Gauss beam amounted to 288 nm. In FIGS. 2C and 2D, scale bars having lengths of 5 microns are shown in the lower right corner. FIG. 2C illustrates the intensity distribution of a finite Bessel-Gauss beam in the propagation direction, and FIG. 2D illustrates the cross-section of Bessel beam.

Figure 3F:
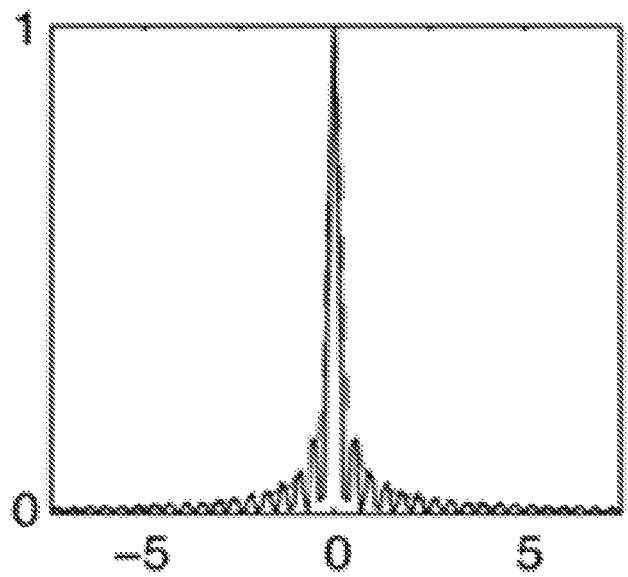
FIG. 3F is a plot of an exemplary profile of a simulated extended depth-of-focus beam and a Bessel-Gauss beam in the lateral dimension.
Figure 3E:
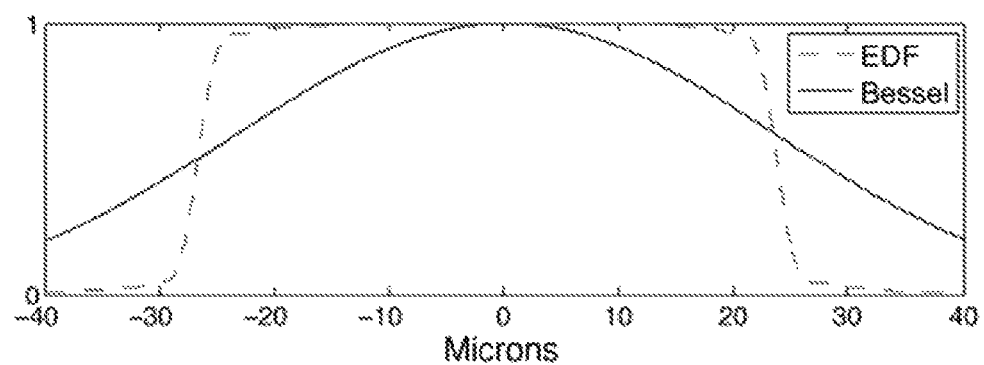
FIG. 3E is a plot of an exemplary profile of a simulated extended depth-of-focus beam and a Bessel-Gauss beam in the propagation dimension.

Referring to FIGS. 3E and 3F, exemplary profile plots of the simulated extended depth-of-focus beam and Bessel-Gauss beams in the propagation dimension and the lateral dimension, respectively, are shown. FIG. 3E illustrates that, as the annulus in reciprocal space has a finite width, the propagation length of the Bessel-Gauss beam is also finite and exhibits a Gaussian intensity distribution with a FWHM of 55 microns. As can be seen by comparing FIGS. 3A-3D, the extended focus beam, when convolved with a 50 micron long line, has approximately the same FWHM, but the axial beam profile looks analogous to a top hat, providing even illumination over approximately 50 microns and decaying rapidly at its ends. With the Bessel-Gauss beam, a similar evenness can only be achieved over a narrow region around its peak (approximately 10 microns). The aforementioned simulations provide the intensity profile for a single beam. However, to generate a digital sheet of light, the beam must be rapidly scanned in the X-direction. To obtain the intensity distribution of a scanned beam, the cross-sectional intensity distribution, as shown in FIGS. 3B and 3D, of each beam was convolved with a line in the X-direction.

Figure 4A:
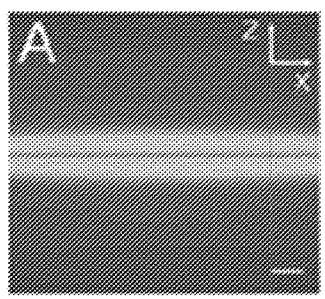
FIG. 4A is an illustration of a light-sheet obtained with the Bessel-Gauss beam over a 50 microns propagation distance.
Figure 4B:
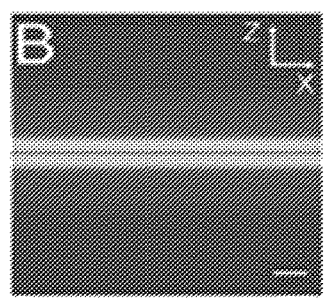
FIG. 4B is an illustration of a light-sheet obtained by extended focusing over a 50 microns propagation distance.
Figure 4C:
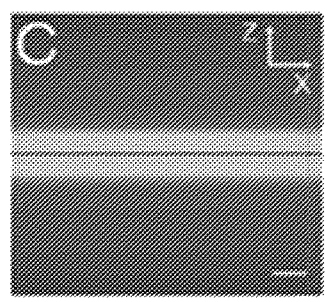
FIG. 4C is an illustration of a light-sheet obtained by extended focusing over 100 microns propagation distance.
Figure 4D:
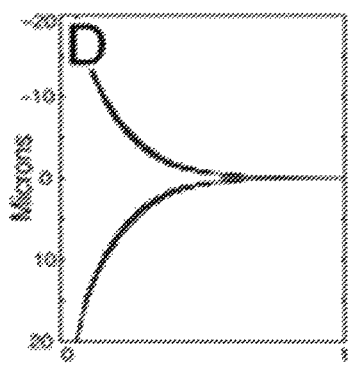
FIG. 4D is an illustration of an axial cross-section of a light-sheet obtained with the Bessel-Gauss beam with a 50 microns propagation distance.
Figure 4E:
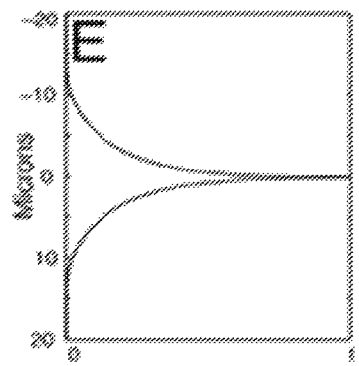
FIG. 4E is an illustration of a light-sheet obtained by extended focusing over 50 microns.
Figure 4F:
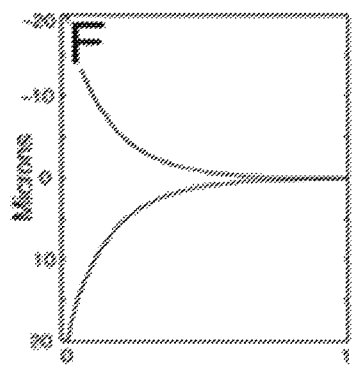
FIG. 4F is an illustration of a cross section a light-sheet obtained by extended focusing over 100 microns.

Referring to FIG. 4A, a light-sheet obtained with the Bessel-Gauss beam over a 50 microns propagation distance is shown, and the corresponding axial cross-section is shown in FIG. 4D. As shown in FIG. 4A, a large skirt extends over several tens of microns. This intensity distribution is the result of integrating the contributions of all rings along the X-direction. It is noted that for shorter Bessel-Gauss beams, the energy within the concentric ring system is reduced, thereby decreasing the magnitude of the skirt. Referring to FIGS. 4B and 4C, light-sheets obtained by extended focusing over 50 and 100 microns propagation distance, respectively, are shown, and corresponding cross-sections are shown in FIGS. 4E and 4F, respectively. As shown in FIGS. 4B, 4C, 4E, and 4F, extended focusing also introduces a beam skirt that scales with propagation length, but its axial extent is reduced relative to Bessel-Gauss beams. Thus, the configuration of the imaging system 100 utilizing extended focusing provides a reduced beam skirt relative to imaging system configurations utilizing Bessel-Gauss beams.

To characterize the extended focus, beam profiles in transmission were imaged by rearranging the detection arm (e.g., the detection objective 218, the tenth lens 248, and the camera 216) such that it was collinear with the optical axis of the illumination objective and both objectives (e.g., the excitation objective 214 and the detection objective 218) shared the same focal plane. A shear plate was used to confirm that the input beam into the excitation objective 214 and the output beam from the detection objective 218 were both well collimated with the third lens 234 powered off. During this simulation, 3D data sets were acquired by Z-stepping the detection objective over 100 microns.

Figure 5A:
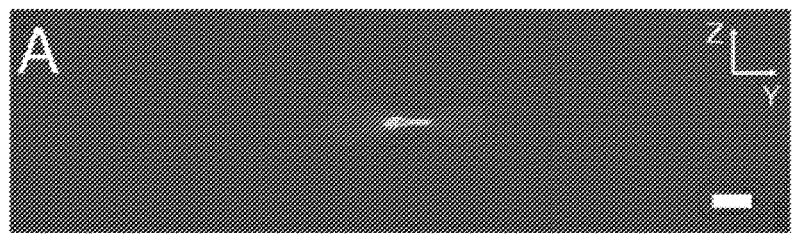
FIG. 5A is an illustration of a maximum intensity projection of the propagation of a Gaussian beam.
Figure 5B:
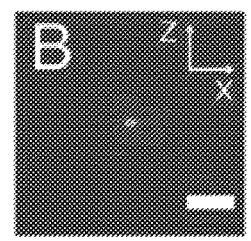
FIG. 5B is a cross-section of Gaussian beam at laser focus.
Figure 5C:
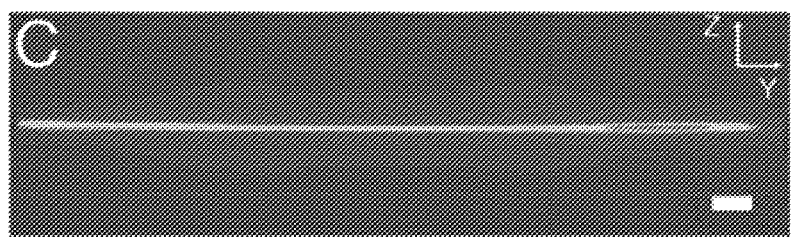
FIG. 5C is a maximum intensity projection of the propagation of an extended focus Gaussian beam.
Figure 5D:
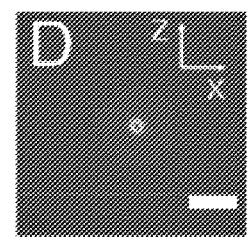
FIG. 5D is a cross-section of extended focus Gaussian beam at middle of the propagation distance.
Figure 5E:
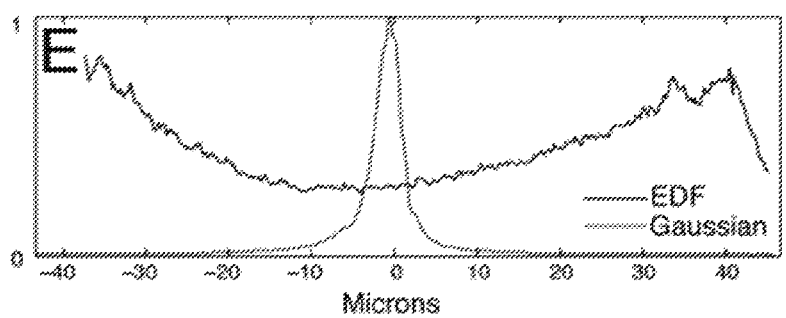
FIG. 5E is an intensity profile for extended focus and Gaussian beams in the propagation direction.
Figure 5F:
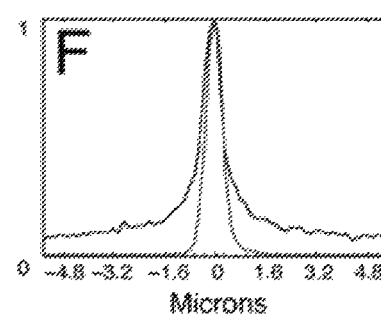
FIG. 5F is an overlay of beam cross-sections for extended focus and Gaussian beams at the center of the propagation trajectory.

Referring to FIGS. 5A and 5C, a maximum intensity projection of a normal (i.e., with the third lens 234 turned off) laser focus, and an extended focus (i.e., with the third lens 234 running at 191 kHz and 30% power) as measured in transmission are illustrated. FIGS. 5B and 5D illustrate corresponding lateral cross sections through the beams illustrated in FIGS. 5A and 5C, respectively. Line profiles along the propagation direction and the lateral direction through the two beams are shown in FIGS. 5E and 5F, respectively. The lateral FWHM of the Gaussian beam (e.g., normal laser focus beam) is 497 nm, whereas the extended focus measured 726±77 nm (mean and standard deviation measured over 80 microns along the Y-direction). It is noted that the FWHM drops to 546 nm and 592 nm at each end of the beam. As the laser spot is moving sinusoidally back and forth, the end points of the extended focus are brighter than the central part of the beam, as shown in FIGS. 4C and 4E. For practical imaging, we decided to use the central part of the extended focus to illuminate a 512×512 pixel field of view on the camera (corresponding to an area of 82×82 microns).

Referring to FIGS. 6A-6G, extended focus point spread function (PSF) measurements using sub-diffraction fluorescent nanospheres and illumination by a light sheet obtained by extended focusing are shown. A 1 micron scale bar is shown in the lower right portion of FIGS. 6A and 6E. It is noted that, although not shown, the scale bars illustrated in FIGS. 6A and 6E are representative of the scale of FIGS. 6B-6D and FIGS. 6F and 6G. FIG. 6A illustrates use of a standard camera-based widefield imaging of a single sub-diffraction nanosphere using a light sheet generated by extended focusing. FIGS. 6B and 6C illustrate the PSF of a nanosphere imaged with a 480 nm and 160 nm virtual confocal slit, respectively. FIG. 6D illustrates a linearly deconvolved sub-diffraction nanosphere showing near-isotropic axial and lateral resolution, and FIG. 6E illustrates a YZ maximum intensity projection of a 3D bead data set using a virtual slit aperture of 480 nm and linear deconvolution with Wiener filtering. FIGS. 6F and 6G are excerpts of FIG. 6E illustrating that the configuration of the imaging system 100 maintains shift-invariant imaging throughout the imaging volume (82×82×80 microns), and correspond to the boxes in the lower left corner and upper right corner of FIG. 5E, respectively, which are both located near the edges of the imaging volume.

It is noted that the images of FIGS. 6A-6G were generated using 200 nm fluorescent nanospheres embedded in a cube of agarose. An axial step size of 200 nm was used throughout, and generated a near-isotropic voxel size having a lateral pixel dimension of 160 nm. As illustrated in FIG. 6A, a cross-section through an ensemble averaged PSF as obtained with a light-sheet using extended focus illumination and normal orthogonal widefield detection exhibits PSF with a bright maximum, yet the residual beam skirt results in a slightly elongated PSF in the Z-direction. However, in contrast to a Bessel-Gauss LSFM, the PSF does not exhibit side lobes, but rather decays monotonically in Z. FIGS. 6B and 6C show the PSF obtained by descanning the extended focus as it sweeps the field laterally with a 480 and 160 nm wide (in sample space) virtual confocal slit aperture, respectively, shrink the PSF in the axial direction considerably. However, using a slit aperture of 160 nm (corresponding to 1 camera pixel) does not noticeably improve the PSF any further. FIG. 6D shows the PSF after linear Wiener deconvolution of the 480 nm confocal aperture data set. Here, the axial FWHM is 698 nm, which is in agreement with the FWHM of the extended focus that was measured in transmission. The lateral FWHM was equal to 460 nm.

Figure 7:
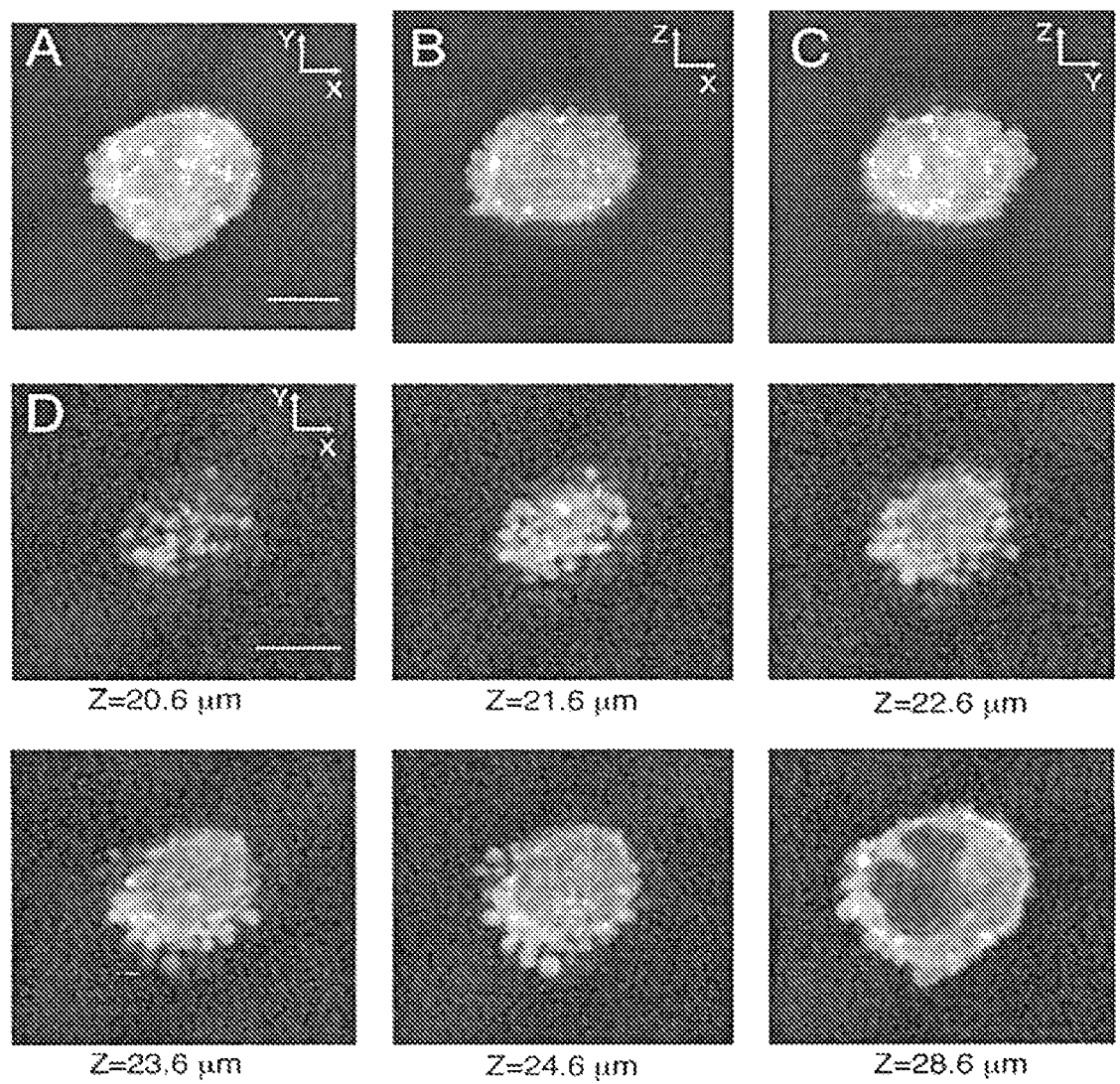
FIG. 7 is an illustration of maximum intensity projections of melanoma cells and XY slices through a melanoma cell imaged in accordance with embodiments.

Referring to FIG. 7, maximum intensity projections of melanoma cells and XY slices through a melanoma cell imaged in accordance with embodiments are shown. The imaged melanoma (MV3) cells were cultured in Dulbecco's modified essential medium (DMEM) supplemented with 10% fetal bovine serum (FBS) and penicillin-streptomycin. An N-terminal fusion of mNeonGreen and actin with a 7 amino-acid linker was integrated into the genome of the MV3 cells using lentivirus, and puromycin was used to eliminate non-fluorescent cells. Live imaging of the melanoma cells was performed at room temperature and the sample chamber of the microscope was filled with phosphate buffered saline. For maximum rejection of out-of-focus blur, confocal descanning was performed with a virtual slit of 160 nm width, the exposure time for one image frame was set to 20 milliseconds (e.g., the camera integration period=20 ms), and the axial step size to 200 nm. Each 3D stack encompassed 50 microns axially and took 5.3 seconds to acquire. An additional pause of 20 seconds was inserted between time points. During the imaging of the melanoma cells, blebbing (e.g., dynamic hemispherical membrane protrusions) and movement of the cells was observed. The top row of images in FIG. 7 display the maximum intensity projections along the Z, Y and X directions, respectively. The second and third rows of images of FIG. 7 shows six XY cross sections at different depths through a single cell, illustrate that individual blebs can be clearly resolved and sectioned using the imaging system 200 according to embodiments.

Figure 8:
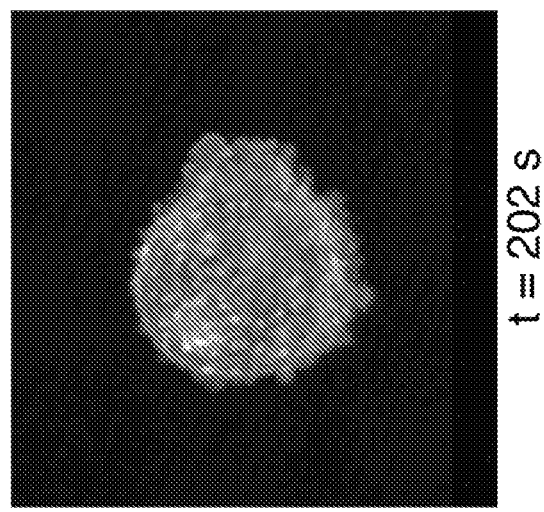
FIG. 8 is an illustration of maximum intensity projections for a melanoma cell along the optical axis for three time points of a time-lapse series imaged in accordance with embodiments.
Figure 8:
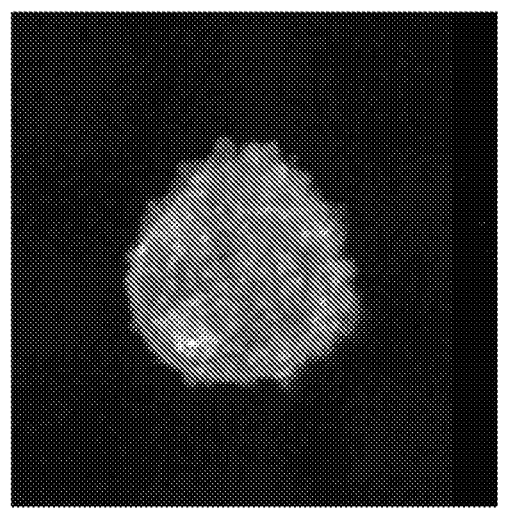
Figure 8:
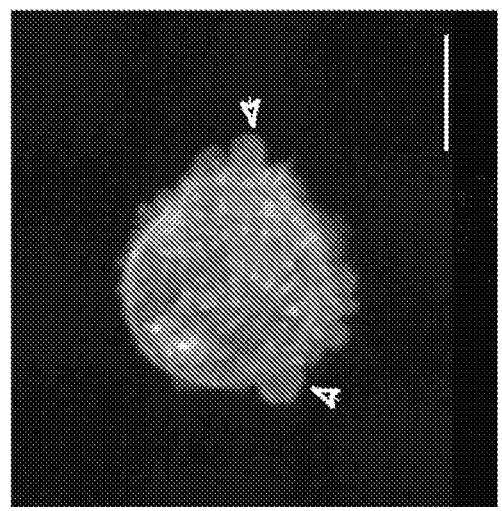

Referring to FIG. 8, maximum intensity projections for a melanoma cell along the optical axis for three time points of a time-lapse series imaged in accordance with embodiments and encompassing 10 time points are shown. In the leftmost image, arrows mark two large blebs in the first time point. As shown in the center image of FIG. 8, the bleb on the left leaves an F-actin 'scar' after its decay that is visible at t=102 seconds. It is noted that the scale bar in the leftmost image is 10 microns in length.

Figure 9:
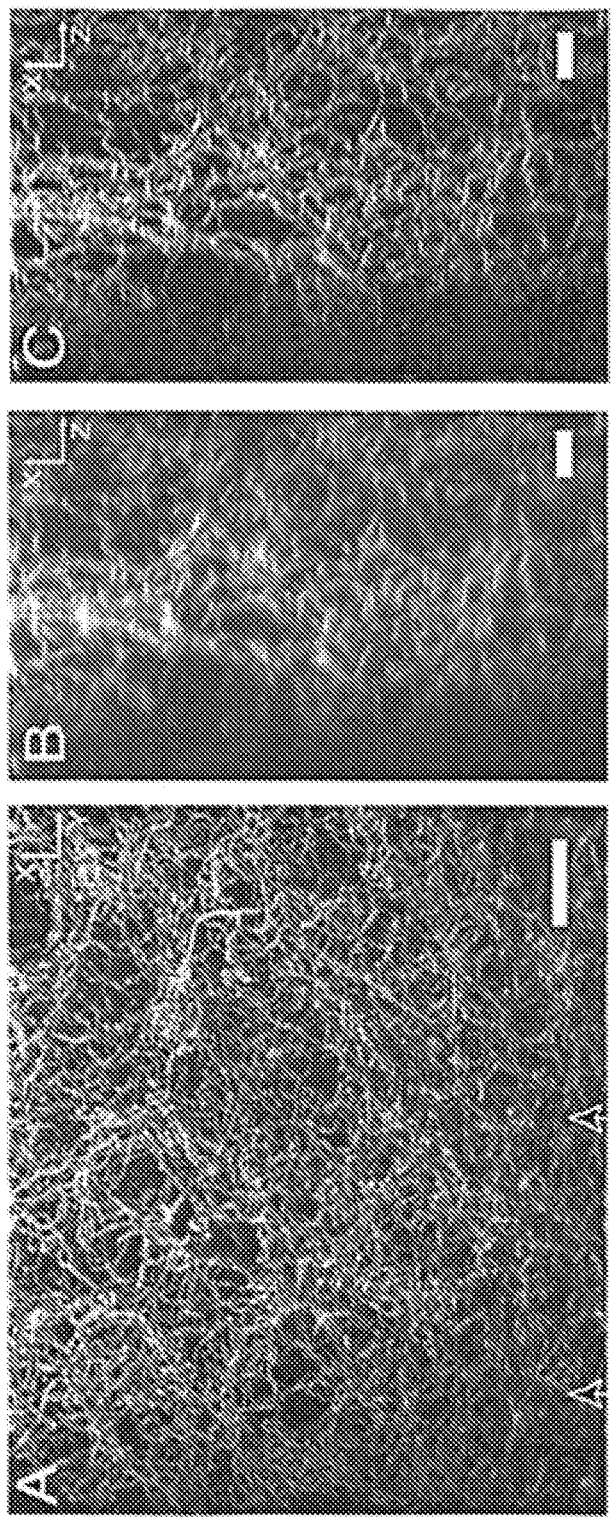
FIG. 9 is an illustration of maximum intensity projections of fluorescently labeled collagen imaged according to embodiments.

To demonstrate extended focus LSFM on a larger specimen, fluorescently labeled collagen was imaged using an imaging system according to embodiments (e.g., the imaging system 200 of FIG. 2). Referring to FIG. 9, maximum intensity projections of fluorescently labeled collagen imaged according to embodiments are shown. The leftmost image "A" corresponds to an XY maximum intensity projection spanning 80 microns in Z following linear deconvolution; the center image "B" corresponds to an XZ maximum intensity projection spanning 40 microns in Y before linear deconvolution, and the rightmost image "C" corresponds to an XZ maximum intensity projection spanning 40 microns in Y after linear deconvolution. In each image, the scale bars represent 10 microns. The arrowheads in the left most image "A" mark the region of "A" represented in the center and right most images "B" and "C."

To generate the images of FIG. 9, confocal descanning was performed with a 4 pixel (640 nm in sample space) virtual slit, and the image stack was acquired with an axial step size of 300 nm. The image "A" shows a linearly deconvolved maximum intensity projection in XY spanning an image volume of 82×82×80 microns, while the images "B" and "C" show the raw and deconvolved maximum intensity projections in XZ, respectively, over 40 microns in Y. Comparison of images "B" and "C" illustrates that residual blur present in the raw data (e.g., image "B") is almost completely removed by linear deconvolution, as shown in image "C," such that individual fibers can be clearly distinguished in the lateral as well as the axial view.

From the descriptions of FIGS. 3A-9 above, it is seen that light-sheet illumination using extended focusing in accordance with the imaging system 200 of FIG. 2, and as described with reference to FIG. 1, provides more uniform lateral illumination field results as compared to Gaussian and Bessel-Gauss beams. Additionally, during operation of the imaging system 200 of FIG. 2, only the sample volume in the immediate proximity of the field of view is illuminated. In contrast, to achieve a similarly flat illumination field using Bessel-Gauss beams would require a significantly larger propagation length, which would illuminate cells beyond the field of view and increase the strength of the side lobes. Further, even for equivalent propagation distances, the simulations described with reference to FIGS. 3A-9 demonstrate that extended focusing results in a higher confinement of excitation power to the focal plane than Bessel-Gauss illumination.

Figure 10:
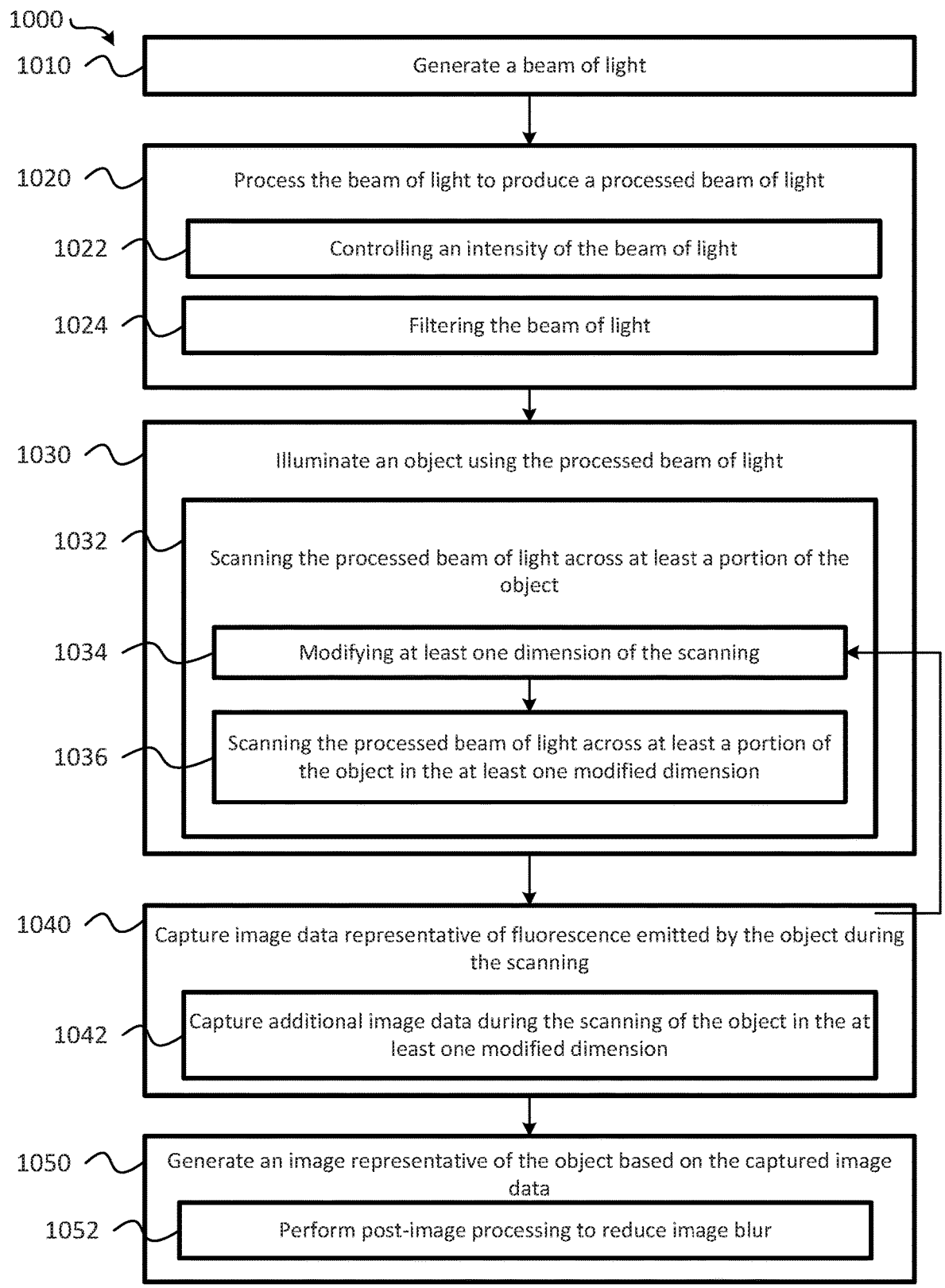
FIG. 10 is a flow diagram illustrating an embodiment of a method for imaging an object using a pencil of light through an extended depth of focus mechanism.

Referring to FIG. 10, a flow diagram illustrating an embodiment of a method for imaging an object using a pencil of light through an extended depth of focus mechanism is shown as a method 1800. In an embodiment, method 1800 may be performed by an imaging system (e.g., the imaging system 200 of FIG. 2, or the imaging system 1200 of FIG. 12) configured with appropriate components to generate a pencil of light and sweep the pencil of light across an object. In an additional or alternative embodiment, a memory may store instructions that, when executed by a processor, cause the processor to control an imaging system to perform operations corresponding to the method 1000.

At 1010, the method 1000 includes generating a beam of light. In an embodiment, the beam of light may be generated by a light source (e.g., the light source 210 of FIG. 2 or the light source 1210 of FIG. 12). In an additional or alternative embodiment, the method 1000 may include generating multiple beams of light, such as for multi-color imaging or for other purposes or imaging system configurations. At 1020, the method 1000 may include processing the beam of light to produce a processed beam of light. In an embodiment, processing the beam of light to produce the processed beam of light may include, at 1022, controlling an intensity of the beam of light, and, at 1024, filtering the beam of light. In an embodiment, the intensity of the beam of light may be controlled using a modulator (e.g., the intensity modulator 212 of FIG. 2). In an embodiment, filtering the beam of light may be performed using one or more irises, pinholes, or lenses (e.g., the third lens 234 of FIG. 2), other components, or a combination thereof. In an embodiment, processing the beam of light may produce a Gaussian beam, as described with reference to FIG. 2.

At 1030, the method 1000 includes illuminating an object using the processed beam of light. In an embodiment, illuminating the object may include, at 1032, scanning the processed beam of light across at least a portion of the object. At 1040, the method 1000 includes capturing image data representative of fluorescence emitted by the object during the scanning, and, at 1050, generating an image representative of the object based on the captured image data. In an embodiment, the captured image data may be time-averaged image data representative of average fluorescence emissions detected during the time period corresponding to the scanning of the object. In an embodiment, the method 1000 may include performing post-image processing to reduce image blur, and to increase the resolution of the image generated at 1050.

In an embodiment, the image generated at 1050 may be based on a plurality of images generated from the captured image data. For example, in an embodiment, first image data may be captured during a scan (e.g., steps 1030, 1032, 1040). The first image data may represent a first slice of the object being imaged. Subsequent to capturing the first image data, the method 1000 may include, at 1034, modifying a dimension of the scanning, scanning the processed beam of light across the object in the at least one modified dimension, at 1036, and, at 1042, capturing additional image data during the scanning of the object in the at least one modified dimension. For example, the initial scan may have been through a first slice of the object, and modifying the dimension of the scanning may cause the subsequent scanning to pass through a different slice of the object (e.g., an adjacent slice). This process may continue until all slices of the object, or at least a desired portion of the object, have been scanned and images. At the conclusion of the imaging, a final image may be generated representing all slices of the object. In an embodiment, the scanning of the object, at 1032 and/or 1036, may include rapidly scanning the Gaussian beam back and forth across at least the portion of the object along an axis for a time period. The camera may capture image data during the time period, where the image data represents a time average of fluorescence emissions emitted from the object during the scanning.

Imaging systems operating in accordance with the method 1000 may be operable to produce high-resolution images with little or no blur using the captured image data. Further, the image data may be captured by the imaging system with relatively low initial setup (e.g., little or no synchronization of the camera(s) to the scanning). Each imaged slice of the object may be a 2D or 3D slice. In some embodiments, the imaging system may capture image data and generate images using two or more colors, such as when the imaging system is configured with multiple cameras and appropriate filters. Thus, the method 1000 provides an improved LSFM technique for imaging objects using a pencil of light generated by extended focusing.

Figure 11:
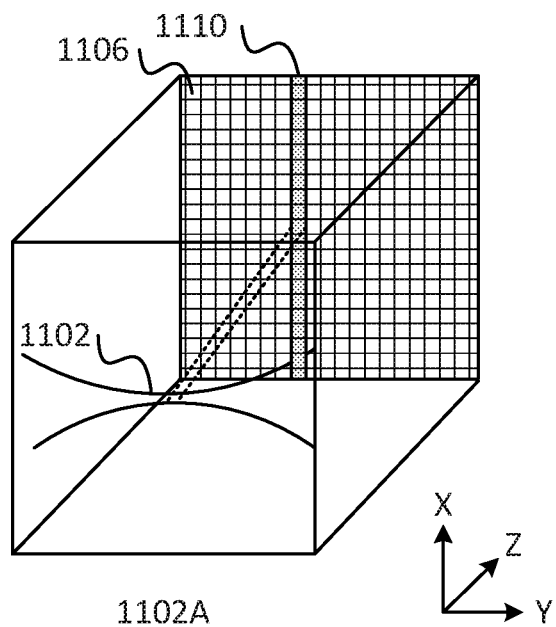
FIG. 11 is a second exemplary embodiment of a technique for generating 3D images of an object using LSFM techniques according to the present disclosure.
Figure 11:
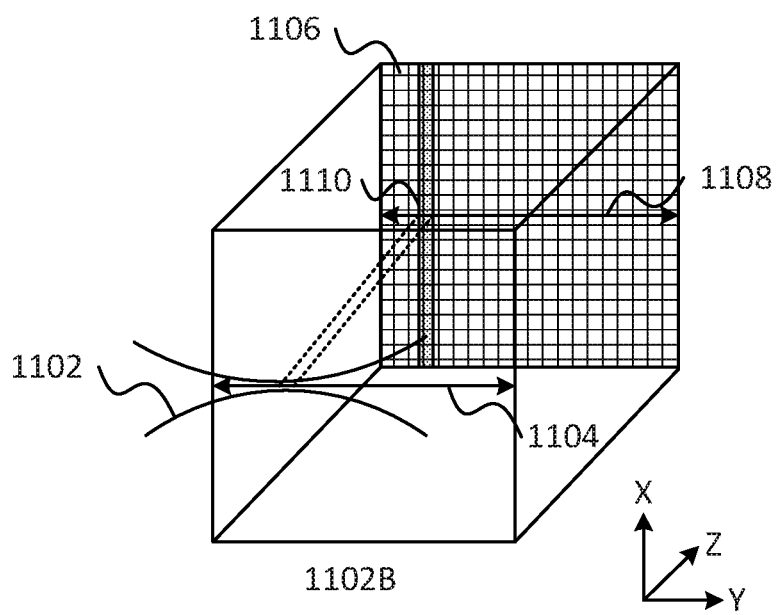

Referring to FIG. 11, a second exemplary embodiment of a technique for generating images of an object using LSFM techniques according to the present disclosure is shown. At 1102A, a laser line focus 1102 may be used to illuminate an object. In an embodiment, the laser line focus 1102 may propagate through the object axially along the y-axis, and may be scanned across the object along the z-axis. In an embodiment, the laser line focus 1102 may be generated from a beam of light emitted by a light source (e.g., a laser, etc.) of a microscope. The microscope may include components (e.g., a cylindrical lens, irises, pinholes, etc.) configured to process the beam of light to form the laser line focus 1102. For example, a cylindrical lens may be used to focus the beam of light along a single dimension to form the laser line focus 1102. The laser line focus 1102 may be provided to an excitation objective of the microscope, where the excitation objective is configured to illuminate the object using the laser line focus 1102. The illumination may cause fluorescence emissions to be emitted by the object. The microscope may include a detection objective coupled to a camera. In an embodiment, the detection objective and the camera may be oriented orthogonally to the propagation direction (i.e., the detection objective and the camera may be oriented along the z-axis). The detection objective may collect the fluorescence emissions from the object, and provide the emissions to the camera. In FIG. 11, pixels 1106 are shown. The pixels 1106 may correspond to image data captured by the camera during the imaging process. As shown in FIG. 11, illumination of the object using the laser line focus 1102 may cause a column of pixels 1110 to be illuminated with fluorescence light from the beam waist (e.g., the in-focus region) of the laser line focus. The camera may be configured to only capture image data corresponding to the in-focus region (or column).

For example, as shown at 1102B, the active pixels 1110 of the camera may capture image data from the in-focus region of the illuminated object, while not capturing image data corresponding to the out-of-focus region of the illuminated object, as indicated by the dashed lines. The width of the in-focus region may be determined by the Rayleigh length ($L_R$) of the laser line focus. To capture a complete image, the axial position of the laser line focus 1102 may be swept across the object in the y-axis, as indicated at 1104. The region of active pixels may be synchronized to the sweeping of the axial position of the laser line focus 1102, such that the active pixels 1110 capture only in-focus image data, as indicated at 1108. By restricting the active pixels 1110 of the camera to this in-focus region only, all image data captured by the camera is in-focus and blur is rejected, allowing capture of a clear image in a single pass of the laser line focus across the object. Subsequent images may be captured by altering the position of the laser line focus 1102 along the z-axis, and a final image may be generated from the captured images. In an additional or alternative embodiment, the axial position of the laser line focus 1102 may be moved in discrete steps and separate images may be acquired for each position of the laser line focus. The final image encompassing an extended field of view may be computationally combined from the images acquired for each beam position. In contrast to continuously sweeping the axial position of the laser line focus, this has the advantage that conventional cameras may be used.

Thus, in contrast to the first exemplary technique described with reference to FIG. 1, the laser line focus 1102 is not rapidly swept axially back and forth across the object, and instead, requires only a single axial sweep across the object Additionally, because only the in-focus region of the laser line focus 1102 is used by the camera for image acquisition, no post-processing of the captured image may be required to produce high resolution images, whereas, in the first technique described with reference to FIG. 1, the camera captures data from a time-averaged pencil of light (e.g., an extended depth of focus beam), which may include image data captured from the in-focus region and out-of-focus regions surrounding the pencil of light, causing the image to be slightly blurred and requiring post-processing to increase the resolution of the image.

Figure 12:
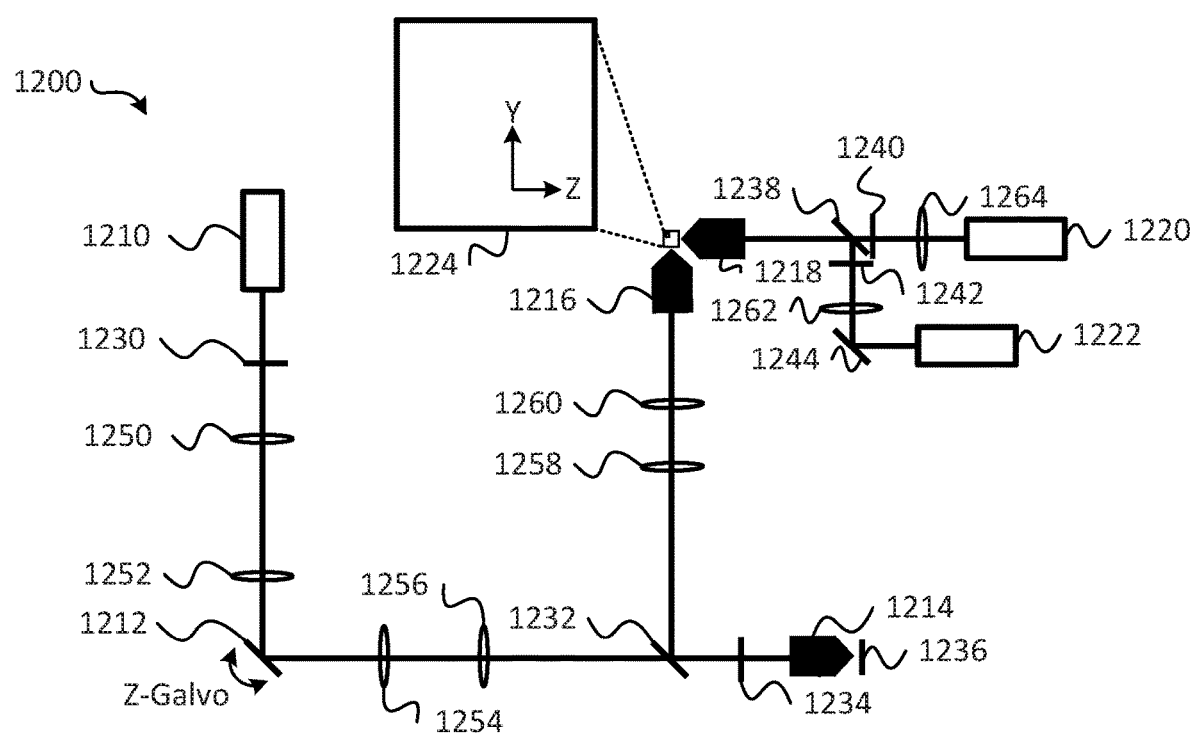
FIG. 12 is a schematic diagram illustrating a second embodiment of an imaging system according to the present disclosure.

Referring to FIG. 12, a schematic diagram illustrating a second embodiment of an imaging system according to the present disclosure is shown as an imaging system 1200. As shown in FIG. 12, the imaging system 1200 includes a light source 1210, Z-galvo 1212, a remote focusing objective 1214, an excitation objective 1216, a detection objective 1218, a first camera 1220, and a second camera 1222, and an object 1224 to be imaged. In an embodiment, the object 1224 may be prepared in a manner similar to the object 220 of FIG. 2. In an additional or alternative embodiment, the object or element to be imaged may be prepared in a different manner. For example, in an additional or alternative embodiment, the element to be imaged may be placed onto a coverslip. In an embodiment, the coverslip may be mounted at 45 degrees relative to the objectives 1216, 1218. It is noted that, although FIG. 12 illustrates the imaging system 1200 as including two cameras 1220, 1222, in additional or alternative embodiments a single camera, or more than two cameras may be used depending on a particular application and configuration of the imaging system 1200. For example, two cameras may be used to generate 2 color images using the imaging system 1200, while a single camera may be used to generate single color images using the imaging system 1200. Additionally, as shown in FIG. 12, the imaging system 1200 includes a half wave plate (HWP) 1230, a cylindrical lens 1250, an achromatic lens 1252, a scan lens 1254, a tube lens 1256, a polarizing beam splitter (PBS) 1232, a quarter wave plate (QWP) 1234, a tube lens 1258, a tube lens 1260, filters and mirrors 1240, 1242, and 1244, and additional lenses 1262, 1264. It is noted that the particular arrangement and configuration of the imaging system 1200 is provided for purposes of illustration, rather than by way of limitation, and that other arrangements and configurations of imaging systems may be used in accordance with the embodiments disclosed herein. The imaging system 1200 may be used to generate images of the object 1224. In an embodiment, the images may be 3D images, and may be generated from 3D data sets captured by the imaging system 1200, as described in more detail below.

In an embodiment, the imaging system 1200 may be configured to operate under the control of a computing system (not shown in FIG. 12). For example, the computing system may include a processor configured to control the operations of the imaging system 1200. In an embodiment, the processor may include a central processing unit executing instructions stored in a memory of the computing system, where the instructions, when executed by the processor, cause the processor to perform the operations described in connection with the imaging system 1200 with reference to FIGS. 11-18, and may use the technique briefly described above with reference to FIG. 11, or the first technique described above with reference to FIGS. 1-10 (e.g., using a pencil of light) by incorporating an X-galvo. In an additional or alternative embodiment, the processor may include one or more application specific integrated circuits (ASICs), a field programmable gate array (FPGA), circuitry, or other hardware and/or software components configured to perform the operations described in connection with the imaging system 1200 with reference to FIGS. 11-18, and may use the technique briefly described above with reference to FIG. 11 or the first technique described above with reference to FIGS. 1-10 (e.g., a pencil of light) by incorporating an X-galvo.

The light source 1210 may include one or more components configured to generate beams of light. In an embodiment, the one or more components may include a continuous wave laser(s). Results illustrating the operations of the imaging system 1200 were performed with a light source 1210 including two continuous wave lasers are described below with reference to FIGS. 13-17. However, it is noted that imaging system 1200 may be configured to operate using a light source 1210 that includes a single laser. During operation, the light source 1210 may generate a beam of light. The beam of light may be provided to a modulator (not shown in FIG. 12). In an embodiment, the modulator may be an acousto-optic or electro-optic modulator or another device configured to shutter the beam of light. When more than one beam of light is used, each beam of light may be shuttered independently, and aligned into a common optical path (e.g., using a dichroic mirror, not shown in FIG. 12). The beam(s) of light may be focused through a 30-micron spatial filter (e.g., a pinhole, not shown in FIG. 12), and expanded to a beam diameter of 12 mm (1/e2). To provide uniform illumination intensity at the sample (e.g., the object 1224), the beam(s) may be truncated with an iris (not shown in FIG. 12), allowing only the central portion of the beam(s) to be used for imaging by the imaging system 1200. The HWP 1230 may be used to control the polarization of the beam(s).

The cylindrical lens 1250 may focus the beam(s) to a line profile that is then relayed to the image plane of the remote focusing objective 1214 using the achromatic lens 1252, the Z-galvo 1212, and the lenses 1254, 1256, and a 40×0.8 NA water-dipping objective (Nikon Instruments). In the prototype of the imaging system 1200 of FIG. 12 used to generate the images of FIGS. 13-17, the PBS 1232 and the QWP 1234 were placed intermediate to the back pupil plane of the remote focusing objective 1214.

The mirror 1236 was mounted to a flexure-guided piezo actuator, and placed at the focal plane of the remote focusing objective 1214 so that the laser line focus generated by the cylindrical lens was reflected off of the mirror 1236 and recollected by the remote focusing objective 1214. The recollected laser line focus was then passed to the QWP 1234 a second time, turning the polarization of the reflected light (e.g., the laser line focus) by 90 degrees, causing the PBS 1232 to reflect the laser line focus towards the excitation objective 1216. In an embodiment, the remote focusing objective 1214 and the excitation objective 1216 may be 40×0.8 NA water-dipping objectives. In additional or alternative embodiments, the NA value of the remote focusing objective 1214 and the excitation objective 1216 may be above 0.8 or below 0.8. In another additional or alternative embodiment, one or both of the objectives 1214, 1216 may be air objectives. During the operation of the prototype imaging system configured as illustrated in FIG. 12, light transmission through and reflection off of the PBS 1232 was optimized with rotation of the HWP 1230 and QWP 1234, respectively, and the back pupil plane of the remote focusing objective 1214 was imaged 1:1 to the back pupil plane of the excitation objective 1216 with the tube lenses 1258, 1260.

The detection objective 1218 was aligned orthogonal to the excitation objective 1216, as shown in FIG. 12. In an embodiment, the detection objective 1218 may be a 40×0.8 NA water-dipping objective. In additional or alternative embodiments, the NA value of the detection objective 1218 may be above 0.8 or below 0.8. The detection objective 1218 was scanned synchronously with the illumination beam position in the z dimension with a piezo actuator. Fluorescence leaving the detection objective 1218 was spectrally separated and isolated for multicolor imaging with an ultra-flat dichroic mirror 1238, and bandpass emission filters 1240, 1242, respectively, within the infinity space of the imaging system 1200. Subsequently, each fluorescence channel was individually imaged onto the active area of the cameras 1220, 1222 with infinity-corrected tube lenses 1262, 1264. In an embodiment, the cameras 1220, 1222 may be scientific complementary metal-oxide-semiconductor (sCMOS) cameras configured to synchronously capture image data representative of detected fluorescence emissions corresponding to an in-focus region of the laser line focus used to illuminate the object 1224. That is, during imaging, pixels of the cameras 1220, 122 were only active when capturing image data corresponding to the in-focus region of the laser line focus. It is noted that additional mirrors may be required to ensure that the cameras 1220, 1222 capture images that may be combined. For example, with an odd number of reflections, images captured by the cameras 1220, 122 would be mirror images along the x direction to each other and consequently, the image of the laser line focus would move in opposite directions.

The imaging system 1200 may generate 3D data by acquiring a single image at each plane by sweeping the axial position of the laser line focus once synchronously with the active pixels of the sCMOS camera in "light-sheet mode." Once completed, the laser line focus, the Z-galvo 1212, and the detection objective 1218 may be moved to a new focal plane, and another image may be acquired. This process may be repeated until the entire object, or a portion of interest, has been imaged by the imaging system 1200. In an embodiment, the step size in the z-direction may be adjusted to 160 nm and 450 nm in the high and low NA mode, respectively.

Images captured using the image system 1200 may be high resolution without requiring any post-image processing. For example, and referring to FIG. 13, a schematic diagram illustrating a technique for capturing image data corresponding to an in-focus region of a laser line focus is shown. In the upper portion of FIG. 13, a laser line focus is shown having an in-focus region. In an embodiment, a size of the in-focus region may be determined by the Rayleigh length ($L_R$) of the beam. The laser line focus may be swept across an object (e.g., the object 1224 of FIG. 12) in an axial or propagation direction, and the illumination may cause the object to emit fluorescence that, when detected by a detection objective (e.g., the detection objective 1218 of FIG. 12), a tube lens (e.g., one of the tube lenses 1262, 1264 of FIG. 12), and a camera (e.g., one of the cameras 1220, 1222 of FIG. 12), allows the camera to generate image data.

Figure 13:
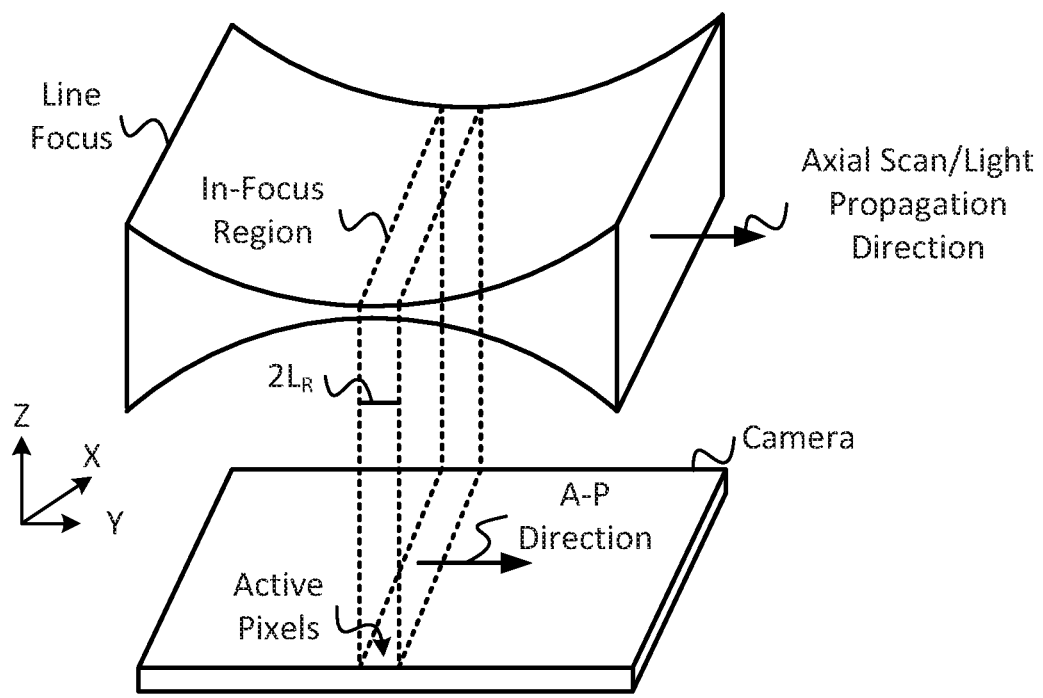
FIG. 13 is a schematic diagram illustrating a technique for capturing image data corresponding to an in-focus region of a laser line focus.
Figure 13:
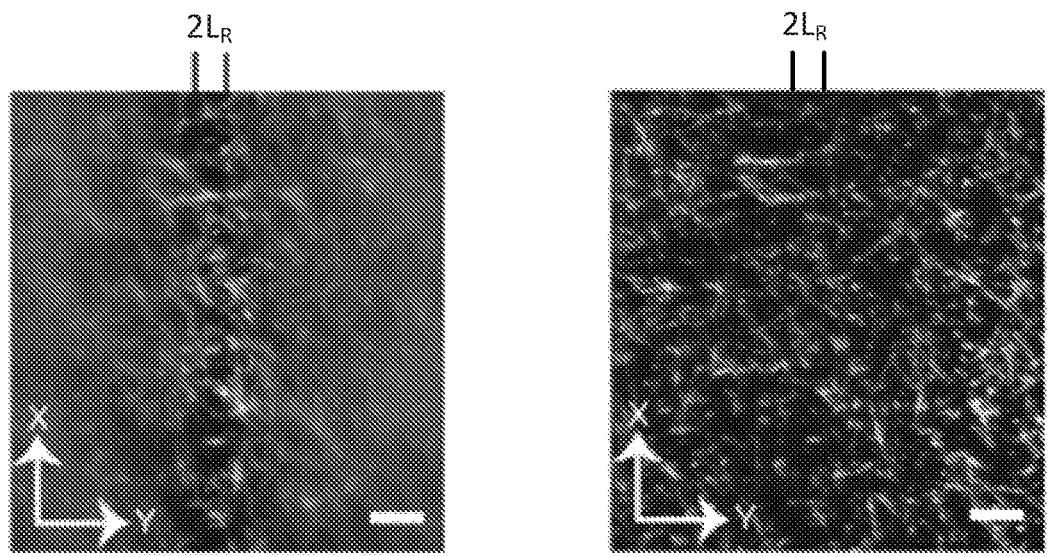

As shown in FIG. 13, active pixels (e.g., pixels that are recording or capturing image data representative of the fluorescence emissions) of the camera may be selectively activated such that the active pixels only capture image data (e.g., fluorescence emissions) that is within the in-focus region of the laser line focus. In this manner, only clear, high-resolution image data is captured, and blur is rejected. For example, the lower left image of FIG. 13 represents an image that would be captured by the camera if all pixels were actively capturing image data. As seen in the lower left image, the column(s) of pixels capturing image data within the in-focus region (indicated by $2L_R$) are clear, while the regions outside of the column(s) of pixels are blurred. The image in the lower right of FIG. 13 illustrates an image captured by synchronously capturing only image data corresponding to the in-focus region using the camera. As can be seen, the image is clear and blur is rejected. The image in the lower right of FIG. 13 was captured in a single axial sweep of the object, and no image post-processing was applied. Thus, an imaging system configured to operate using a line-focus in accordance with embodiments provides for image capture at high resolution without requiring post-image processing to reduce blur and increase the resolution of the image. It is noted that because the active pixels of the camera must be synchronized to track the in-focus region of the laser line focus, the laser line focus techniques of embodiments may require more initial (i.e., pre-image capture) overhead to facilitate the synchronization, whereas the pencil of light technique described above may require more overhead after image capture (e.g., to reduce blur using deconvolution or other techniques).

From the foregoing it is seen that the imaging system 1200, operating in accordance with embodiments for generating images using a laser line focus, produces high-resolution images while rejecting blur almost completely. Further, the laser line focus imaging techniques of embodiments do not require image post-processing, and are able to capture each of the images in a single axial sweep of the laser line focus across the object. As explained in more detail below, the laser line focus imaging techniques of embodiments provide similar or improved performance when compared to existing imaging techniques, such as 2-photon Bessel-Gauss LSFM imaging systems. Thus, the laser line focus techniques of embodiments improve the operation of imaging systems, such as the imaging system 1200, and improve the technical field of LSFM.

Figure 14:
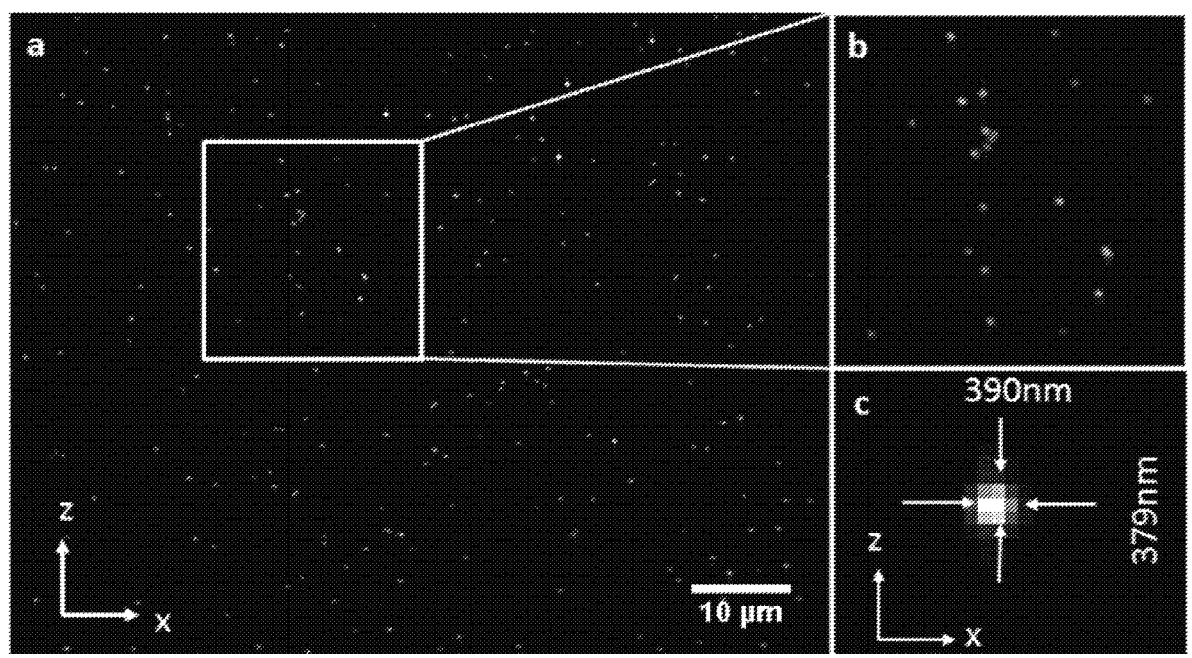
FIG. 14 shows images of fluorescent sub-diffraction nanospheres generated using a laser line focus in accordance with embodiments of the present disclosure.

Referring to FIG. 14, images of fluorescent sub-diffraction nanospheres generated using a laser line focus in accordance with embodiments of the present disclosure are shown. In FIG. 14, the image labeled "a" represents a maximum intensity projection (MIP) of an axial view of 200 nm fluorescent microspheres imaged using a microscope configured for laser line focus imaging according to the embodiments described with reference to FIGS. 11-13 and 18. It is noted that no deconvolution or other post image processing was applied to the images shown in FIG. 14. The image labeled "b" represents a magnified view of the boxed region in "a". The image labeled "c" illustrates the point spread function in the axial direction, and demonstrates that the resolution is almost perfectly isotropic.

Figure 15:
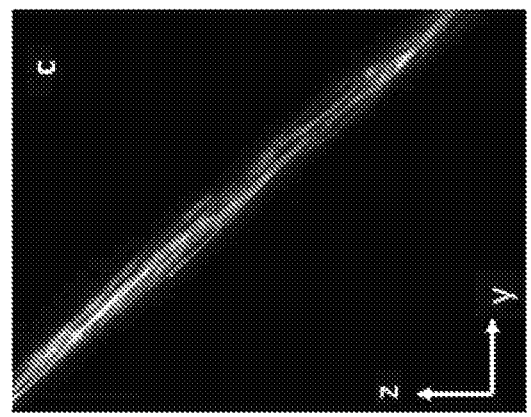
FIG. 15 shows various images of retinal pigment epithelial (RPE) cells captured using a laser line focus technique in accordance with embodiments of the present disclosure.
Figure 15:
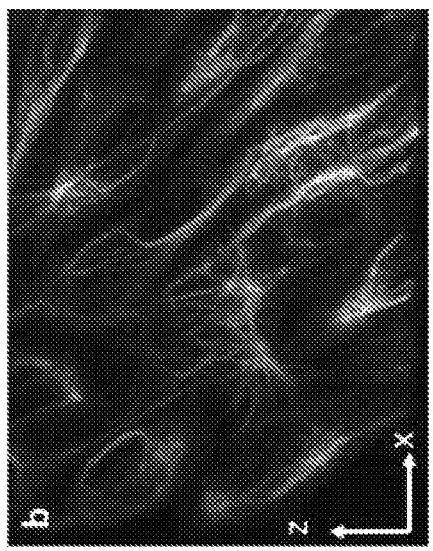
Figure 15:
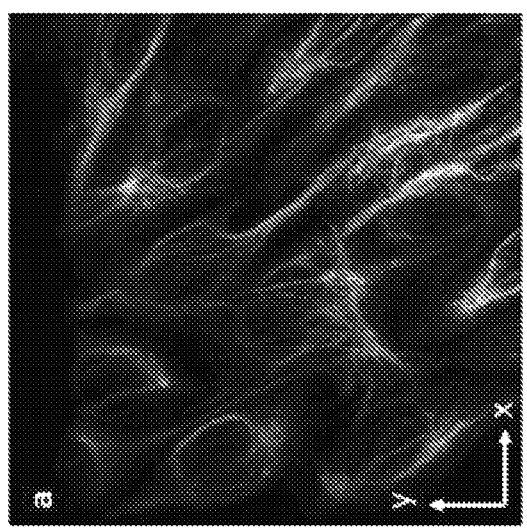

Referring to FIG. 15, various images of retinal pigment epithelial (RPE) cells captured using a laser line focus technique in accordance with embodiments of the present disclosure are shown. The RPE cells were labeled with mEmerald-Vimentin, and plated on a coverslip mounted at 45 degrees relative to the detection objective. It is noted that no deconvolution or other image post-processing was applied to the images shown in FIG. 15. In FIG. 15, the image labeled "a" is an MIP of an X-Y lateral view of the RPE cells, the image labeled "b" is an MIP of an X-Z axial view, and the image labeled "c" is an MIP of a Y-Z axial view that shows the 45 degree orientation of the coverslip. As seen in the images of FIG. 15, the lateral xy view and the axial xz view show the same level of detail. Thus, the laser line focus imaging techniques of embodiments provide for isotropic, high resolution image capture at a plurality of orientations, providing a flexible technique for imaging objects of interest or portions of objects of interest.

Figure 16:
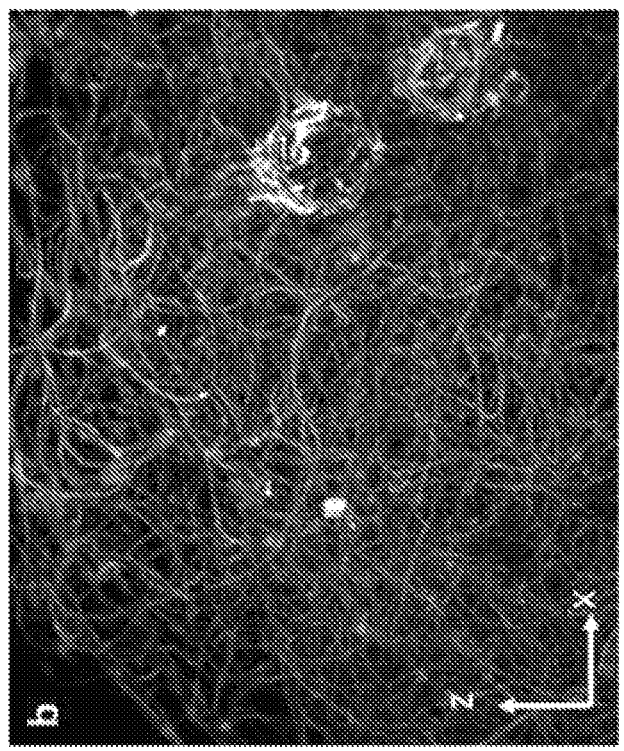
FIG. 16 shows images of a lateral view and an axial view of a fluorescently labeled collagen network generated according to embodiments of the present disclosure.
Figure 16:
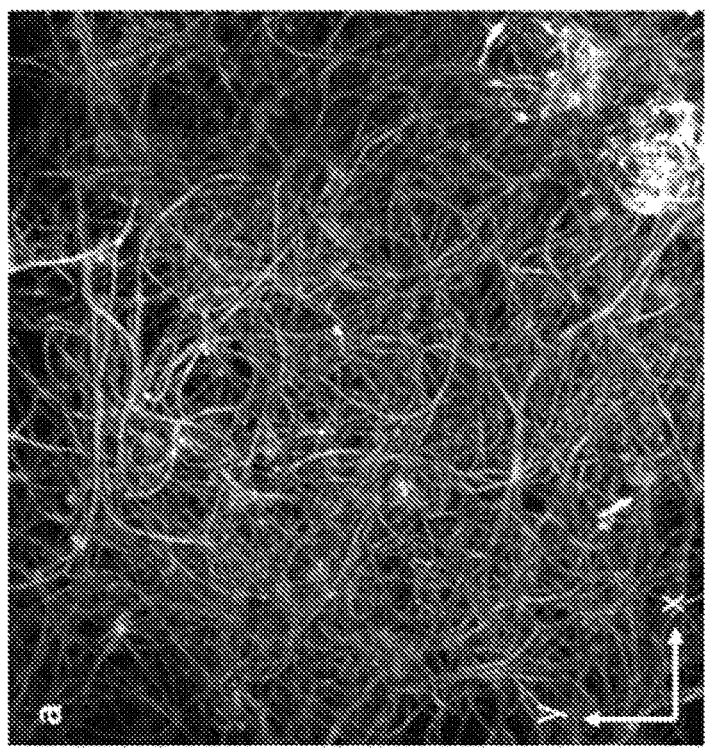

Referring to FIG. 16, images of a lateral view and an axial view of a fluorescently labeled collagen network generated according to embodiments of the present disclosure are shown. In FIG. 16, the left image labeled "a" represents the lateral view of the collagen network, and the right image labeled "b" represents the axial view of the collagen network. The images of FIG. 16 were generated using a laser line focus LSFM technique according to the embodiments described with reference to FIGS. 11-13 and 18. As shown in FIG. 16, the collagen fibers are well resolved in any viewing direction. It is noted that no deconvolution or other post-image processing was applied to the image data used to generate the images of FIG. 16.

Figure 17:
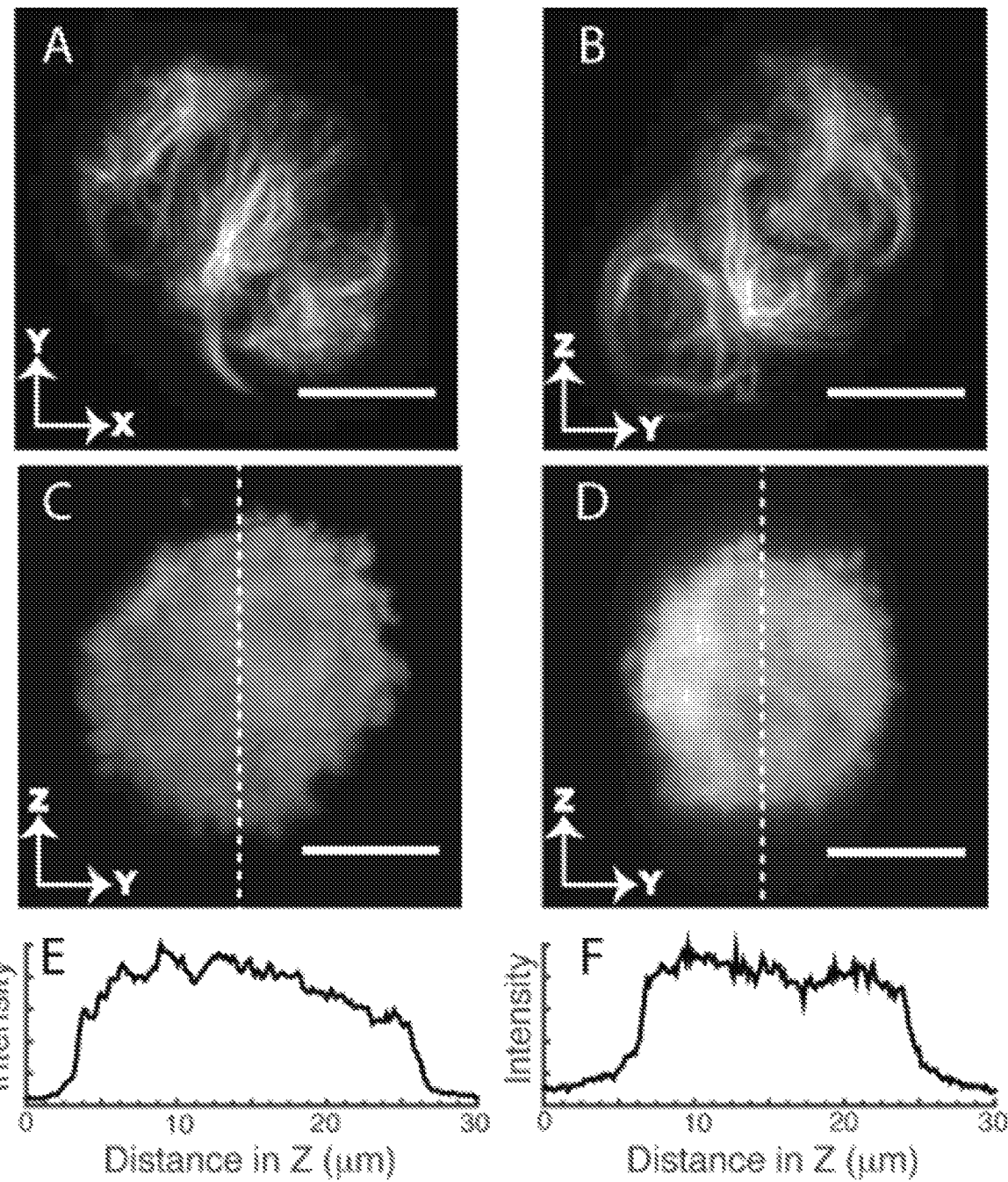
FIG. 17 shows images illustrating the performance of imaging systems operating in accordance with embodiments of the present disclosure relative to other imaging techniques.

Referring to FIG. 17, images illustrating the performance of imaging systems operating in accordance with embodiments of the present disclosure relative to other imaging techniques are shown. In FIG. 17, the scale bars shown in images "A"-"D" represent 10 microns. The image labeled "A" represents a maximum intensity projection (MIP) of a small cluster of retinal pigment epithelial (RPE-1) cells along the Z-direction, and the image labeled "B" represents an MIP of the small Vimentin cluster along the X-direction. The two views provide the same amount of spatial detail, clearly demonstrating the isotropic resolution obtained using a laser line focus LSFM technique of embodiments. The image labeled "C" represents a raw YZ slice of an MV3 melanoma cell labeled with cytosolic mNeon green as imaged using a laser line focus LSFM technique as described with reference to FIGS. 11-13 and 18. The image labeled "D" represents a raw YZ slice of a similar cell as in "C" that was imaged by a Bessel-Gauss two-photon LSFM. Images "E" and "F" illustrate line profiles along the dotted lines in "C" and "D", respectively. Owing to the 2-photon excitation, out-of-focus fluorescence is also strongly suppressed in "D". Nevertheless, some haze can be seen in "D" and "F" that is not present in "C" and "E," which were captured using a laser line focus technique of embodiments. This is apparent in "E" and "F" where "E" more rapidly reaches background values above and below the cell relative to "F." It is noted that images "A"-"D" of FIG. 17 were unprocessed (e.g., no deconvolution, filtering or denoising was applied).

Figure 18:
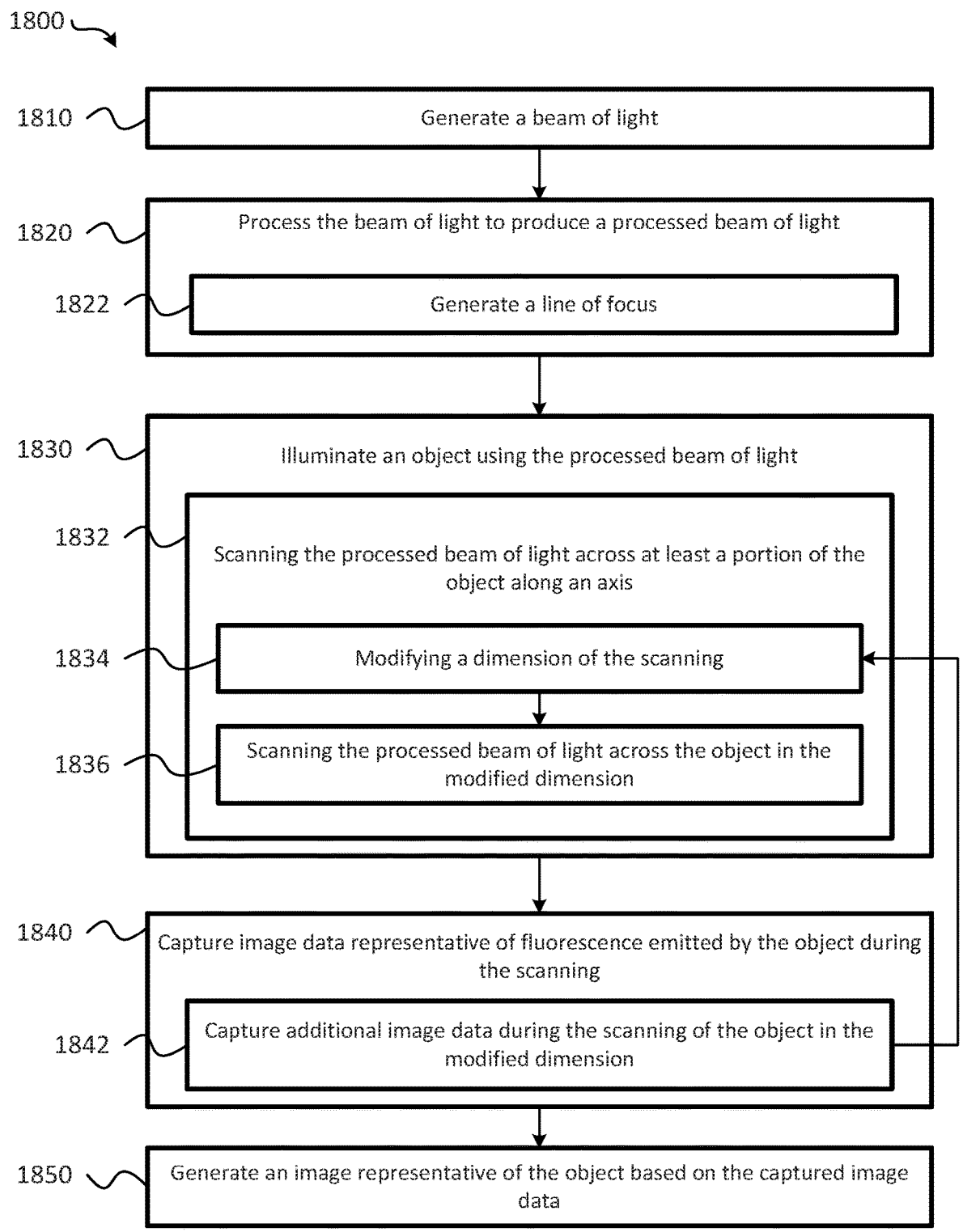
FIG. 18 is a flow diagram illustrating an embodiment of a method for imaging an object using a laser line focus.

Referring to FIG. 18, a flow diagram illustrating an embodiment of a method for imaging an object using a laser line focus is shown as a method 1800. In an embodiment, the method 1800 may be performed by an imaging system (e.g., the imaging system 1200 of FIG. 12, or the imaging system 200 of FIG. 2) configured with a cylindrical lens or other component adapted to generate a laser line focus. In an additional or alternative embodiment, a memory may store instructions that, when executed by a processor, cause the processor to control an imaging system to perform operations corresponding to the method 1800.

At 1810, the method 1800 includes generating a beam of light. In an embodiment, the beam of light may be generated by a light source (e.g., the light source 210 of FIG. 2 or the light source 1210 of FIG. 12). In an additional or alternative embodiment, the method 1800 may include generating multiple beams of light, such as for multi-color imaging or for other purposes or imaging system configurations. At 1820, the method 1800 includes processing the beam of light to produce a processed beam of light. In an embodiment, processing the beam of light to produce the processed beam of light may include generating a laser line focus, at 1822. In an embodiment, the laser line focus may be the laser line focus illustrated with reference to FIG. 13, and may be generating using a cylindrical lens. At 1830, the method 1800 includes illuminating an object using the processed beam of light (e.g., the laser line focus). In an embodiment, illuminating the object may include scanning the processed beam of light across at least a portion of the object along an axis (e.g., an axial sweep), as described with reference to FIGS. 11-13. The laser line focus, when swept across the object, may generate a region of in-focus fluorescence emissions, as shown in FIG. 13 (e.g., lower left image of FIG. 13).

At 1840, the method 1800 includes capturing image data representative of fluorescence emitted by the object during the scanning. In an embodiment, the method 1800 may include synchronizing a camera to the scanning. The synchronization may cause the captured image data to be confined to the region of in-focus fluorescence as it is swept across the object. For example, the synchronization may cause pixels of a camera to be selectively activated such that the active pixels capture image data within an in-focus region of the laser line focus, as described with reference to FIGS. 11-13. The camera may be synchronized to the sweeping of the laser line focus to facilitate the capturing of the image data at the active pixels. At 1850, the method 1800 includes generating an image of the object based on the captured image data.

In an embodiment, the image generated at 1850 may be based on a plurality of images generated from the captured image data. For example, in an embodiment, first image data may be captured during a scan (e.g., steps 1830, 1832, and 1840). The first image data may represent a first slice of the object being imaged. Subsequent to capturing the first image data, the method 1800 may include, at 1834, modifying a dimension of the scanning, at 1836, scanning the processed beam of light across the object in the modified dimension, and, at 1842, capturing additional image data during the scanning of the object in the modified dimension. For example, the initial scan may have been through a first slice of the object, and modifying the dimension of the scanning may cause the subsequent scanning to pass through a different slice of the object (e.g., an adjacent slice). This process may continue until all slices of the object, or at least a desired portion of the object, have been scanned and imaged. During the capturing of the additional image data, additional slices may be imaged, and, at the conclusion of the imaging, a final image may be generated representing all slices of the object.

Imaging systems operating in accordance with the method 1800 may be operable to produce high-resolution images with little or no blur without post-processing of the captured image data. Further, the image data may be captured by the imaging system using single-pass scanning per slice of the object, which may be a 2D or 3D slice. In some embodiments, the imaging system may capture image data and generate images using two or more colors, such as when the imaging system is configured with multiple cameras and appropriate filters. Thus, the method 1800 provides an improved LSFM technique for imaging objects using a laser line focus.

Figure 19:
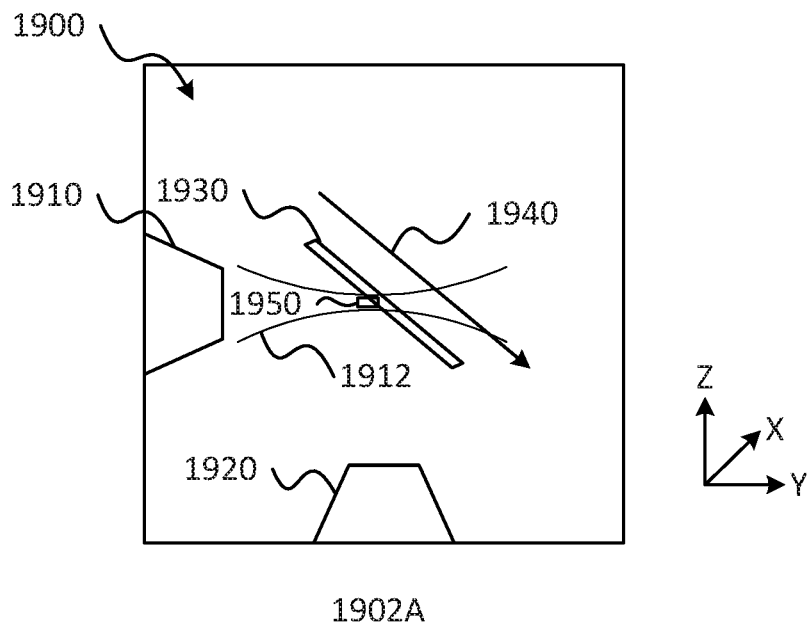
FIG. 19 is a diagram illustrating a third exemplary embodiment of a technique for generating images of an object using LSFM techniques according to the present disclosure.
Figure 19:
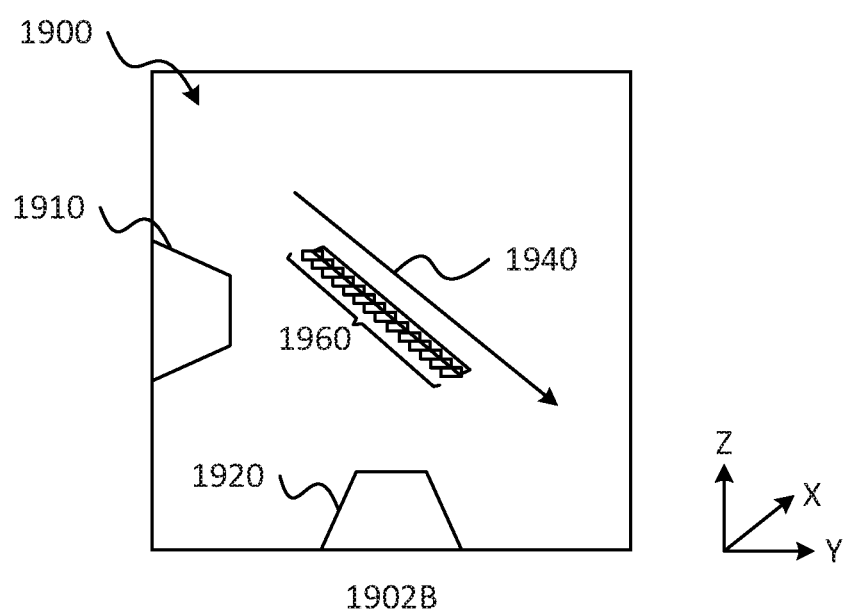

Referring to FIG. 19, a diagram illustrating a third exemplary embodiment of a technique for generating images of an object using LSFM techniques according to the present disclosure is shown. In an embodiment, the LSFM technique illustrated in FIG. 19 may be performed using the imaging system 1200 of FIG. 12 with slight modifications, as described in more detail below. The LSFM technique illustrated in FIG. 19 may be used to generate images (e.g., 3D images) of an object placed into a volume 1900. In an embodiment, the object may be placed onto a cover slip 1930. The cover slip 1930 may be placed within the volume 1900 at an angle relative to a first objective 1910 (e.g., an illumination objective) and a second objective 1920 (e.g., a detection objective). In an embodiment, the angle may be 45 degrees. In an additional or alternative embodiment, the angle may be greater than or less than 45 degrees. In an embodiment, the first objective 1910 may be the excitation objective 1216 of FIG. 12, and the second objective 1920 may be the detection objective 1218 of FIG. 12.

At 1902A, a laser line focus 1912 may be used to illuminate an object on the cover slip 1930. In an embodiment, the laser line focus 1912 may propagate through the object axially along the y-axis, and may be scanned (e.g., by the second objective 1920) across the object along the z-axis. In an embodiment, the laser line focus 1912 may be generated from a beam of light emitted by a light source (e.g., a laser, etc.). The microscope may include components (e.g., a cylindrical lens, irises, pinholes, etc.) configured to process the beam of light to form the laser line focus 1912. For example, a cylindrical lens may be used to focus the beam of light along a single dimension to form the laser line focus 1912. The laser line focus 1912 may be provided to the first objective 1910 of the microscope, where the first objective 1910 is configured to illuminate the object using the laser line focus 1912. The illumination may cause fluorescence to be emitted by the object. The second objective 1920 objective may be coupled to a camera. In an embodiment, as shown in FIG. 19, the second objective 1920 and the camera may be oriented orthogonally to the propagation direction (i.e., the second objective 1920 and the camera may be oriented along the z-axis). The second objective 1920 may collect the fluorescence emissions from the object, and provide the emissions to the camera. In FIG. 19, pixels 1950 are shown. The pixels 1950 may correspond to image data captured by the camera during the imaging process. As shown in FIG. 19, illumination of the object using the laser line focus 1912 may cause a column of pixels 1950 to be illuminated with fluorescent light from the beam waist (e.g., the in-focus region) of the laser line focus 1912. The camera may be configured to only capture image data corresponding to the in-focus region (or column) of the laser line focus 1912 (e.g., the region corresponding to the pixels 1960). In contrast to the embodiment illustrated in FIG. 11, the imaging technique illustrated in FIG. 19 scans the laser line focus 1912 across the object diagonally along the path 1940 (e.g., in the z-axis and y-axis). Thus, the laser line focus 1912 is swept diagonally across the cover slip 1930 and the object to be imaged.

For example, as shown at 1902B, the active pixels 1960 of the camera may capture image data from the illuminated object. The width of the in-focus region may be determined by the Rayleigh length ($L_R$) of the laser line focus 1912. To capture a complete image, the axial position of the laser line focus 1912 may be swept across the object in the z-axis and y-axis, as indicated at 1940. Because the beam is positioned precisely in both the n- and y-axes, all image data captured by the camera is in-focus and blur is rejected, allowing the camera to capture a clear image in a single pass of the laser line focus 1912 across the object and the cover slip 1930. Subsequent images may be captured by altering the position of the laser line focus 1912 along the z-axis and the y-axis, and a final image may be generated from the captured images.

Thus, in contrast to the second exemplary imaging technique described with reference to FIG. 11, the laser line focus 1912 is not swept axially across the object in the y-axis and then moved in the z-axis and re-swept axially to capture the entire object. Instead, the imaging technique of FIG. 19 requires only a single sweep across the object on the cover slip 1930 because the laser line focus 1912 is swept across the object in two dimensions, as further described and illustrated with reference to FIG. 22. Additionally, because only the in-focus region of the laser line focus 1912 is used by the camera for image acquisition, no post-processing of the captured image may be required to produce high resolution images, whereas. Tests have demonstrated that an object can be imaged faster (e.g., up to 10, 20, 30, or even 40 times faster) using the imaging technique illustrated in FIG. 19, as compared to the imaging technique illustrated in FIG. 11. However, the technique illustrated in FIG. 11 may be beneficial when the object to be imaged is of unknown dimensions. Additional aspects and uses of the imaging techniques illustrated with reference to FIGS. 11 and 19 are described below with reference to FIG. 23.

Figure 20:
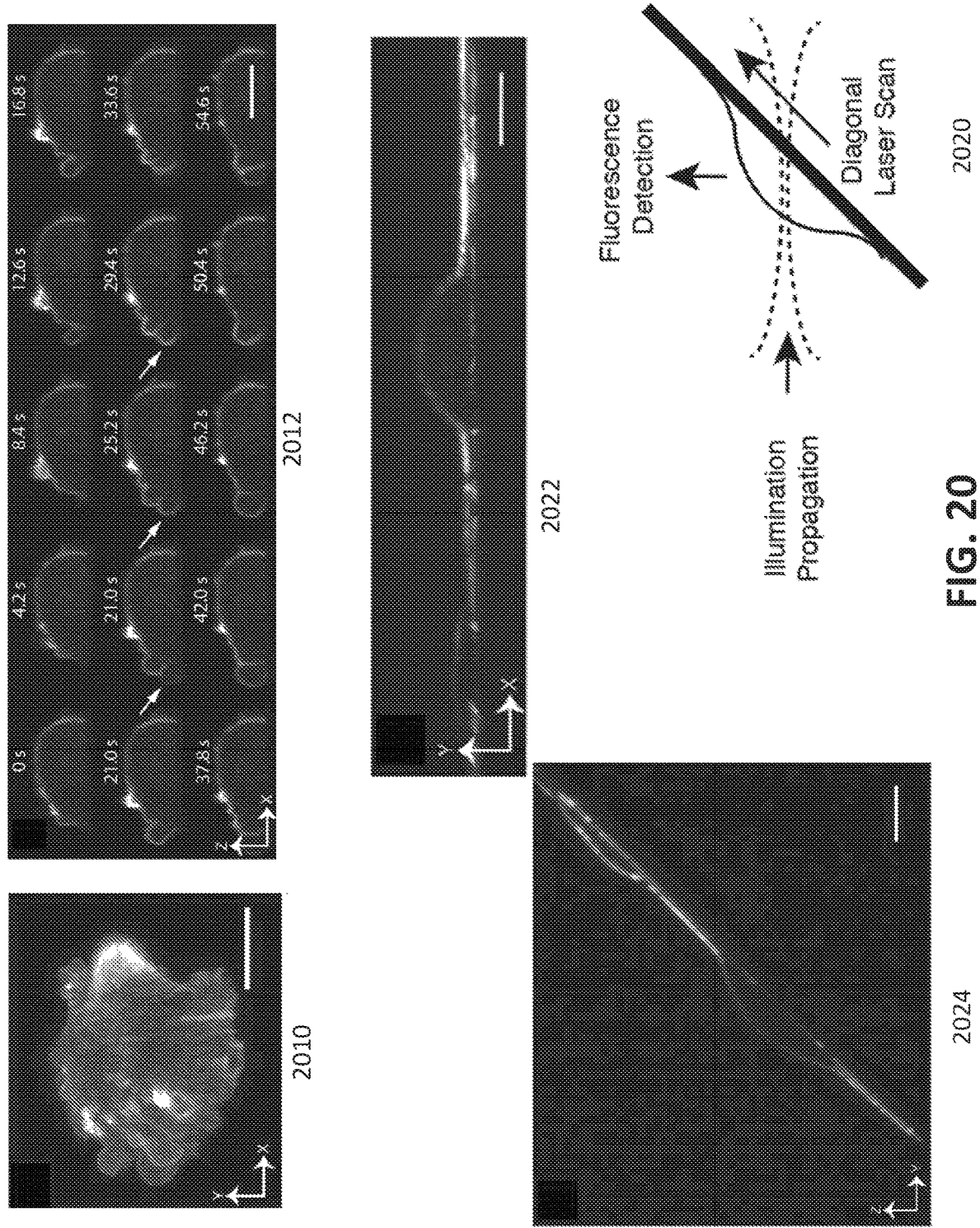
FIG. 20 shows diagrams illustrating various images of objects generated using the imaging technique illustrated in FIG. 19.

Referring to FIG. 20, diagrams illustrating various images of objects generated using the imaging technique illustrated in FIG. 19 are shown. At 2010 and 2012, various different views of a MV3 GFP-Tractin cell undergoing polarized blebbing are shown. Image 2010 shows blebs initiate adjacent to the coverslip on the left and flow towards a stable uropod, located in the upper right. Image 2012 is a montage of bleb formation and cortical flow and shows every 12th time point of a single XZ cross-section. Arrows indicate membrane detachment from the actin cortex, polymerization of a nascent cortical actin meshwork, and flow towards the uropod (not visible in this cross section). In images 2010 and 2012 the scale bar is 10 μm.

Image 2020 illustrate a schematic used to capture the images shown at 2022 and 2024. As shown in image 2020, a laser line focus propagates along the y-axis and illuminates a cell on a cover slip oriented at 45 degrees, and fluorescence is imaged in an orthogonal direction. The laser line focus is scanned diagonally in the S-direction (direction of Diagonal Laser Scan) along the coverslip, and an image is acquired at each Z plane. The beam length may adjusted to encompass the tallest region of the cell (e.g., the nucleus, typically 8-12 μm). Image 2022 shows U2OS cells expressing CyOFP-Tractin acquired at an intermediate Z-plane. Image 2024 shown a single plane in YZ, and illustrates the 45 degree sample geometry, and high degree of optical sectioning. In images 2022 and 2024 the scale bar is 10 μm.

Figure 21:
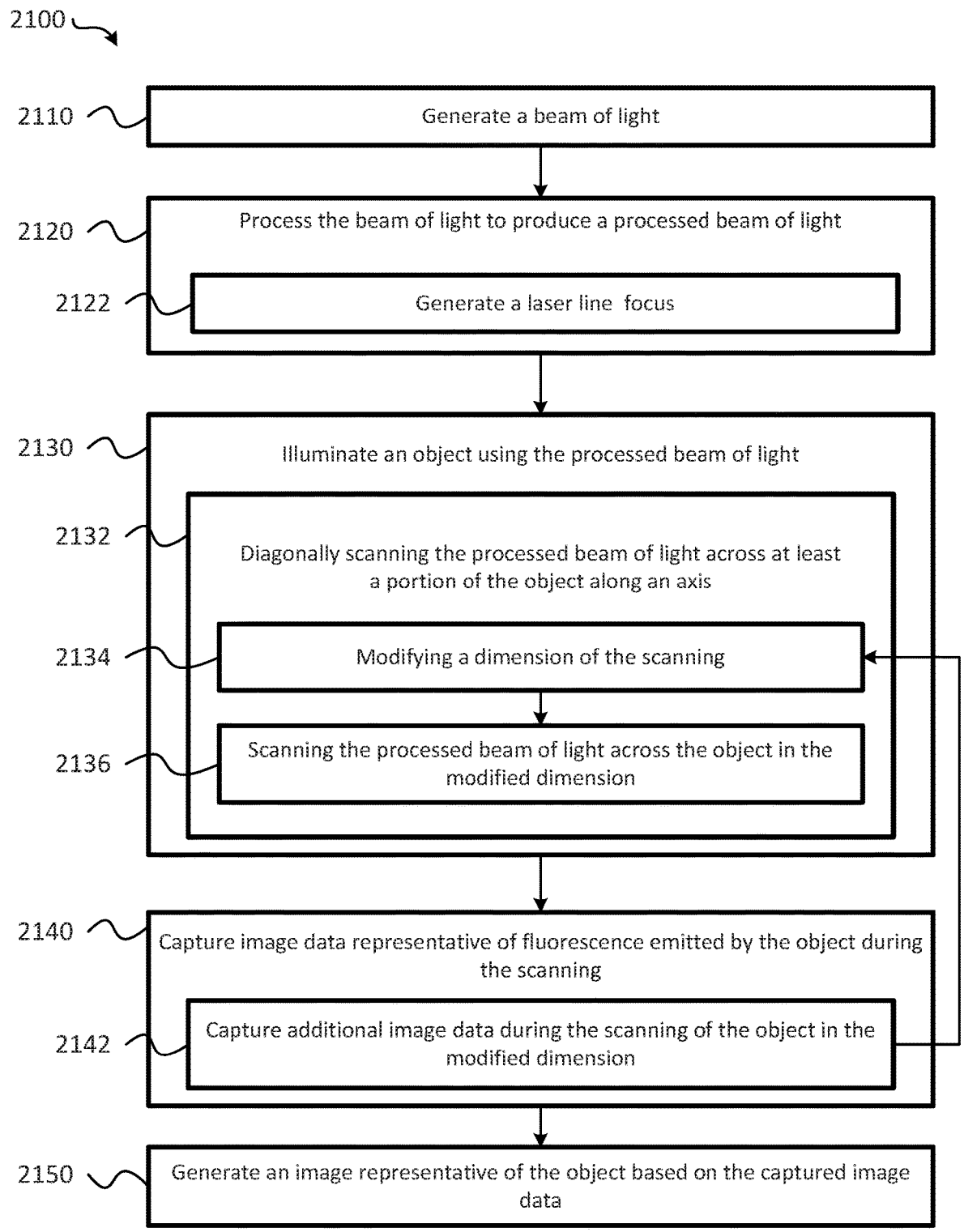
FIG. 21 is a flow diagram illustrating another embodiment of a method for imaging an object using a laser line focus.

Referring to FIG. 21, a flow diagram illustrating another embodiment of a method for imaging an object using a laser line focus is shown as a method 2100. In an embodiment, the method 2100 may be performed by an imaging system (e.g., the imaging system 1200 of FIG. 12, or the imaging system 200 of FIG. 2) configured with a cylindrical lens or other component adapted to generate a laser line focus. In an additional or alternative embodiment, a memory may store instructions that, when executed by a processor, cause the processor to control an imaging system to perform operations corresponding to the method 2100.

At 2110, the method 2100 includes generating a beam of light. In an embodiment, the beam of light may be generated by a light source (e.g., the light source 210 of FIG. 2 or the light source 1210 of FIG. 12). In an additional or alternative embodiment, the method 2100 may include generating multiple beams of light, such as for multi-color imaging or for other purposes or imaging system configurations. At 2120, the method 2100 includes processing the beam of light to produce a processed beam of light. In an embodiment, processing the beam of light to produce the processed beam of light may include, at 2122, generating a laser line focus. In an embodiment, the laser line focus may be the laser line focus 1912 illustrated with reference to FIG. 19, and may be generating using a cylindrical lens. At 2130, the method 2100 includes illuminating an object using the processed beam of light (e.g., the laser line focus). In an embodiment, illuminating the object may include diagonally scanning the processed beam of light across at least a portion of the object, as described with reference to FIG. 19. The laser line focus may generate a region of in-focus fluorescence emissions, as shown in FIG. 19 at 1950 and 1960.

At 2140, the method 2100 includes capturing image data representative of fluorescence emitted by the object during the diagonal scanning. In an embodiment, the method 2100 may include synchronizing a camera to the diagonal scanning. At 2150, the method 2100 includes generating an image of the object based on the captured image data.

In an embodiment, the image generated at 2150 may be based on a plurality of images generated from the captured image data. For example, in an embodiment, first image data may be captured during a scan (e.g., steps 2130, 2132, and 2140). The first image data may represent a first slice of the object being imaged. Subsequent to capturing the first image data, the method 2100 may include, at 2134, modifying a dimension of the scanning, at 2136, scanning the processed beam of light across the object in the modified dimension, and, at 2142, capturing additional image data during the scanning of the object in the modified dimension. For example, the initial scan may have been through a first slice of the object, and modifying the dimension of the scanning may cause the subsequent diagonal scan to pass through a different slice of the object (e.g., a diagonally adjacent slice). This process may continue until all slices of the object, or at least a desired portion of the object, have been scanned and imaged. During the capturing of the additional image data, additional slices may be imaged, and, at the conclusion of the imaging, a final image may be generated representing all slices of the object. In an embodiment, the method 2100 may include scanning the object using the method 1800 of FIG. 18 (e.g., the imaging technique described with reference to FIG. 11) to determine the dimensions of the object, and then scanning the object using the imaging technique described with reference to FIG. 19, as described in more detail below.

Imaging systems operating in accordance with the method 2100 may be operable to produce high-resolution images with little or no blur without post-processing of the captured image data. Further, the image data may be captured by the imaging system operating according to the method 2100 may generate images of the object using a single-pass diagonal scanning of the object. In some embodiments, the imaging system may capture image data and generate images using two or more colors, such as when the imaging system is configured with multiple cameras and appropriate filters. Thus, the method 2100 provides an improved LSFM technique for imaging objects using a laser line focus.

Figure 22:
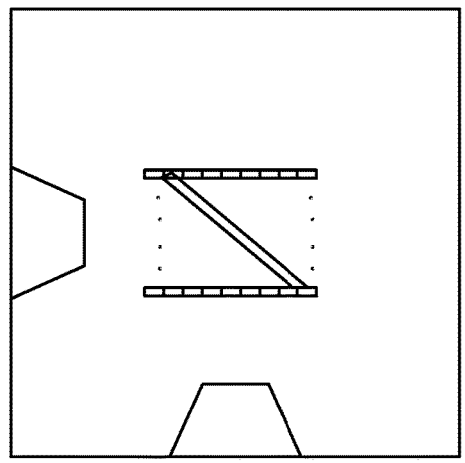
FIG. 22 shows block diagrams comparing various imaging techniques performed according to one or more disclosed embodiments.
Figure 22:
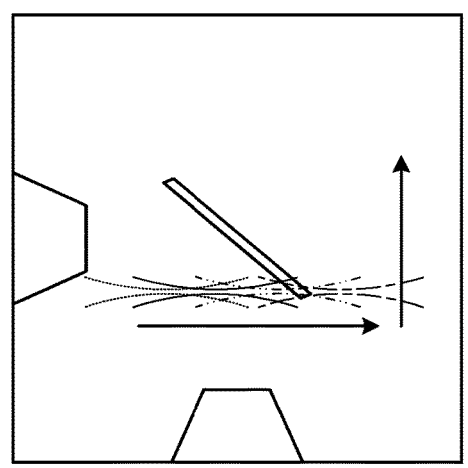
Figure 22:
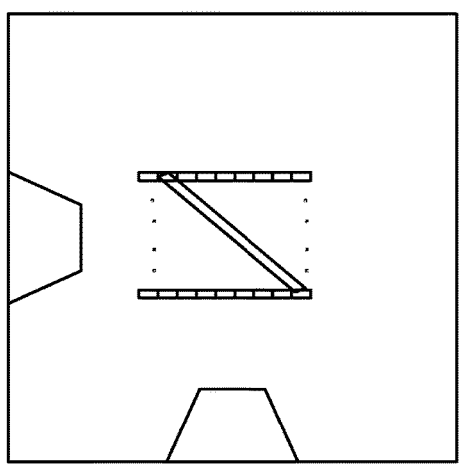
Figure 22:
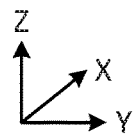
Figure 22:
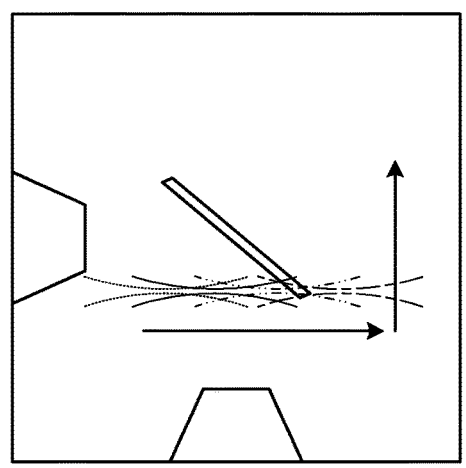
Figure 22:
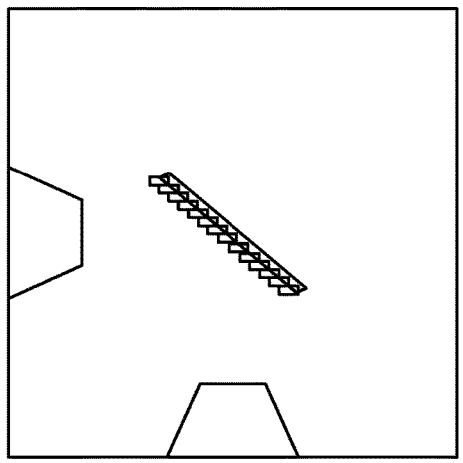
Figure 22:
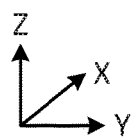
Figure 22:
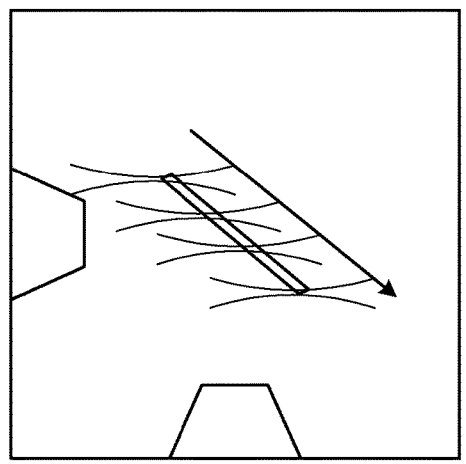

Referring to FIG. 22, block diagrams comparing various imaging techniques performed according to one or more disclosed embodiments are shown. In FIG. 22, the imaging technique described with reference to FIG. 1 is illustrated at 2210, the imaging technique described with reference to FIG. 11 is illustrated at 220, and the imaging technique described with reference to FIG. 19 is illustrated at 2230.

As shown at 2210, a pencil of light may be generated by rapidly scanning a Gaussian beam axially back and forth across the object. The pencil of light may illuminate a portion of the object for a period of time, and the camera may capture image data corresponding to the illuminated portion of the object, as described with reference to FIG. 1. As shown at 2220, a laser line focus may be axially scanned across the object in the y-axis to capture a series of images of the object, where each image is captured at the waist of the laser line focus, and then moved in the z-axis to capture additional images of the object, as described with reference to FIG. 11. As shown at 2230, a laser line focus may be scanned diagonally across the object in two dimensions (e.g., the z-axis and y-axis), thereby enabling the object to be imaged in a single pass, as opposed to making multiple passes, as would be necessary using the imaging techniques illustrated at 2210 and 2220. Thus, the imaging technique illustrated at 2230 may provide for significantly faster image acquisition relative to the other two techniques illustrated at 2210 and 2220.

Figure 23:
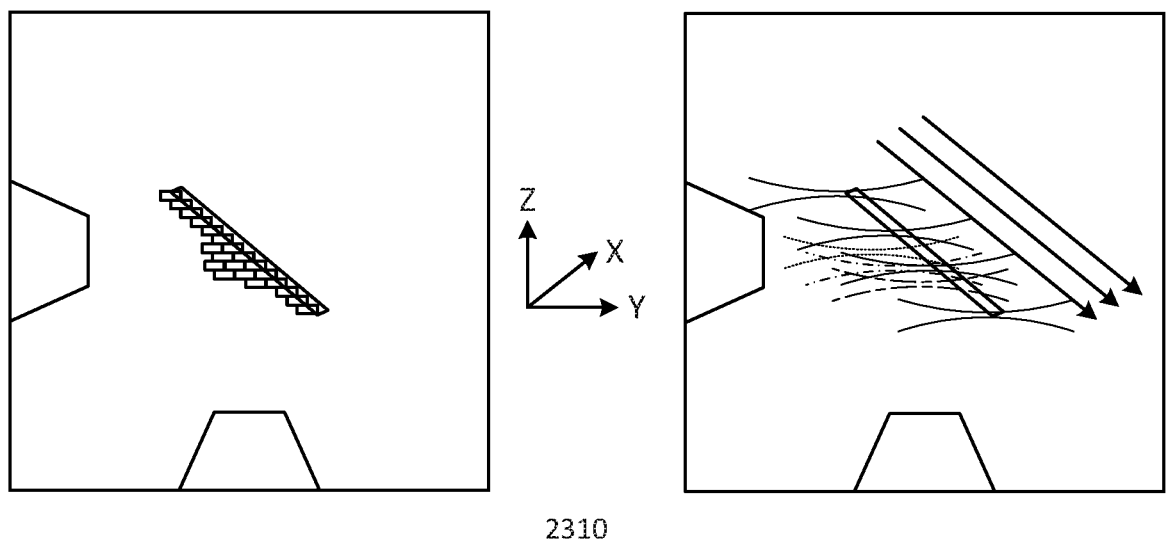
FIG. 23 is a diagram illustrating fourth exemplary embodiment of a technique for generating images of an object using LSFM techniques according to the present disclosure.

Referring to FIG. 23, a diagram illustrating a fourth exemplary embodiment of a technique for generating images of an object using LSFM techniques according to the present disclosure is shown. As shown at 2310, the imaging technique described with reference to FIG. 19 is not limited to capturing images using a single pass. Rather, in some embodiments, multiple passes may be used at select locations to allow for imaging of portions of the object that may be thicker than other portions of the object. This may be accomplished by diagonally scanning the laser line focus diagonally across the object in two dimensions, and then axially scanning the laser line focus in the y-axis at different locations to capture additional images (shown as rectangles). This may enable irregularly shaped objects to be imaged more quickly. In an embodiment, an initial scanning of the object may be performed using the imaging technique described with reference to FIG. 11 to determine the dimensions of the object to be imaged, and then the dimensions may be used to generate a scan according to the embodiment illustrated in FIG. 23 whereby the object is imaged by selectively scanning only the regions within the volume where the object is located, as determined during the initial scan. This may allow the imaging technique illustrated in FIG. 19 to be adapted to perform rapid imaging of an irregularly shaped object.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method comprising:
   generating a beam of light;
   processing the beam of light to produce a processed beam of light;
   illuminating an object using the processed beam of light, the illuminating of the object generating a region of in-focus fluorescence emissions by scanning the processed beam of light across at least a portion of the object in a direction corresponding to a propagation direction of the processed beam of light;

capturing image data representative of fluorescence emitted by the object during the scanning, the image data confined to the region of in-focus fluorescence emissions, wherein blurred image data corresponding to outside the region of in-focus fluorescence emissions is discarded; and generating an image representative of the object based on the image data.

2. The method of claim 1,
wherein,
the processing of the beam of light includes generating a laser line focus, and
the laser line focus, when swept in the direction corresponding to the propagation direction of the processed beam of light across the object, generates the region of in-focus fluorescence emissions.

3. The method of claim 2,
wherein,
the image data is confined to the region of in-focus fluorescence as the laser line focus is swept across the object by synchronizing a camera to the scanning in the direction corresponding to the propagation direction of the processed beam of light,
a single two dimensional (2D) cross-section of the object is captured based on the scanning of the processed beam of light in the direction corresponding to the propagation direction of the processed beam of light and the image representative of the object is generated based on multiple 2D cross-sections captured via multiple scans of the processed beam of light in the direction corresponding to the propagation direction of the processed beam of light, and
each scan of the multiple scans occurs in a direction corresponding to the propagation direction of the processed beam of light at a different position relative to the object.

4. The method of claim 2, wherein the laser line focus is generated using a cylindrical lens.

5. The method of claim 1,
wherein,
the processed beam of light is a laser line focus, and
the image data is captured using single pass scanning in the direction corresponding to the propagation direction of the processed beam of light.

6. The method of claim 1, wherein the image is generated without post-processing the image data.

7. The method of claim 1, wherein the image data is confined to the region of in-focus florescence emissions by synchronizing a camera to the scanning.

8. A method comprising:
generating a beam of light;
processing the beam of light to produce a processed beam of light;
illuminating an object during a time period using the processed beam of light, the illuminating of the object causing fluorescence to be emitted by the object at an area of interest by scanning the processed beam of light across at least a portion of the object in a direction corresponding to a propagation direction of the processed beam of light;

capturing image data during the time period, the image data including time-averaged image data representative of average fluorescence emissions corresponding to the area of interest; and generating one or more images representative of the object based on the image data.

9. The method of claim 8, wherein the processing of the beam of light includes controlling an intensity of the beam of light using an acousto-optic modulator or an electro-optic modulator.

10. The method of claim 8, wherein the processed beam of light is a Gaussian beam, and the scanning includes:
scanning the Gaussian beam back and forth in the direction corresponding to the propagation direction of the processed beam of light across at least the portion of the object for the time period; and
repeatedly modifying at least one dimension of the scanning, and repeating the scanning using the at least one dimension until at least the area of interest of the object has been scanned.

11. The method of claim 10, further comprising:
capturing additional image data representative of fluorescence emitted by the object during the scanning of the object in the at least one dimension until the image data for at least the area of interest has been captured, wherein the image data is the time-averaged image data representative of the average fluorescence emissions detected during the time period corresponding to the scanning at each of the at least one dimension.

12. The method of claim 11, wherein the one or more images is further representative of the additional image data.

13. The method of claim 8, further comprising:
generating a final image from the one or more images.

14. The method of claim 13, further comprising:
processing at least one of the final image and the one or more images to reduce blur and increase resolution.

15. The method of claim 8, wherein the processed beam of light is a Gaussian beam and scanning the Gaussian beam back and forth in the direction corresponding to the propagation direction of the processed beam of light forms a pencil of light illuminating the area of interest during the time period.

16. A method comprising:
generating a beam of light;
processing the beam of light to produce a processed beam of light;
illuminating an object using the processed beam of light, the illuminating of the object using the processed beam of light including diagonally scanning the processed beam of light across the object;
capturing, by a camera, image data representative of fluorescence emitted by the object during the diagonally scanning via a detection objective positioned orthogonal to a propagation direction of the processed beam of light, the detection objective configured to provide the fluorescence to the camera; and
generating an image representative of the object based on the image data.

17. The method of claim 16, wherein the illuminating of the object using the processed beam of light generates a region of in-focus fluorescence emissions.

18. The method of claim 17, wherein the image data is confined to the region of in-focus fluorescence emissions by synchronizing a camera to the scanning.

19. The method of claim 16, wherein the processed beam of light is a Gaussian beam forming a pencil of light during the scanning.

20. The method of claim 16, wherein the processed beam of light includes a laser line focus, the laser line focus scanning diagonally across the object.

* * * * *